United States Patent [19]

Hamano et al.

[11] Patent Number: 5,457,496

[45] Date of Patent: Oct. 10, 1995

[54] DIGITAL IMAGE COMMUNICATION APPARATUS

[75] Inventors: Takashi Hamano; Kiyoshi Sakai; Kiichi Matsuda, all of Kawasaki, Japan

[73] Assignee: Fujitsu Limited, Kawasaki, Japan

[21] Appl. No.: 256,173

[22] PCT Filed: Oct. 19, 1993

[86] PCT No.: PCT/JP93/01507

§ 371 Date: Jun. 28, 1994

§ 102(e) Date: Jun. 28, 1994

[87] PCT Pub. No.: WO94/11992

PCT Pub. Date: May 26, 1994

[30] Foreign Application Priority Data

Nov. 17, 1992 [JP] Japan ................................ 4-307011

[51] Int. Cl.⁶ .................................................. H04N 7/36
[52] U.S. Cl. .................................... 348/415; 348/409
[58] Field of Search ................................ 348/401, 409, 348/412, 413, 415, 416, 417; H04N 7/36

[56] References Cited

U.S. PATENT DOCUMENTS

| | | | |
|---|---|---|---|
| 5,128,756 | 7/1992 | Johnston et al. | 348/417 |
| 5,218,435 | 6/1993 | Lim et al. | 348/409 |
| 5,305,102 | 4/1994 | Knaur et al. | 348/415 |

FOREIGN PATENT DOCUMENTS

| | | |
|---|---|---|
| 0490538 | 6/1992 | European Pat. Off. |
| 0490537 | 6/1992 | European Pat. Off. |
| 4092595 | 3/1992 | Japan |

Primary Examiner—Howard W. Britton
Assistant Examiner—A. Au
Attorney, Agent, or Firm—Greer, Burns & Crain, Ltd.

[57] ABSTRACT

Encoding and decoding systems for a digital image communication apparatus suppresses any reduction in the encoding efficiency due to leaky prediction. A range correcting unit (3) corrects the range of data of a preceding frame stored in a memory (1) according to a reference value outputted from a reference value outputting unit (2). Thereafter, a leak coefficient multiplying unit (4) multiplies the data by a predetermined leak coefficient and outputs the product data. The data outputted from the leak coefficient multiplying unit (4) are uncorrected by an uncorrecting unit (5) to restore the range corrected by the range correcting unit (3). A predictive error outputting unit (6) detects the difference between the digital image data of an inputted present frame and the data uncorrected by the uncorrecting unit (5), and outputs the difference as a predictive error. A predictive error encoding unit (7) encodes the predictive error outputted from the predictive error outputting unit (6), and outputs the encoded predictive error.

15 Claims, 27 Drawing Sheets

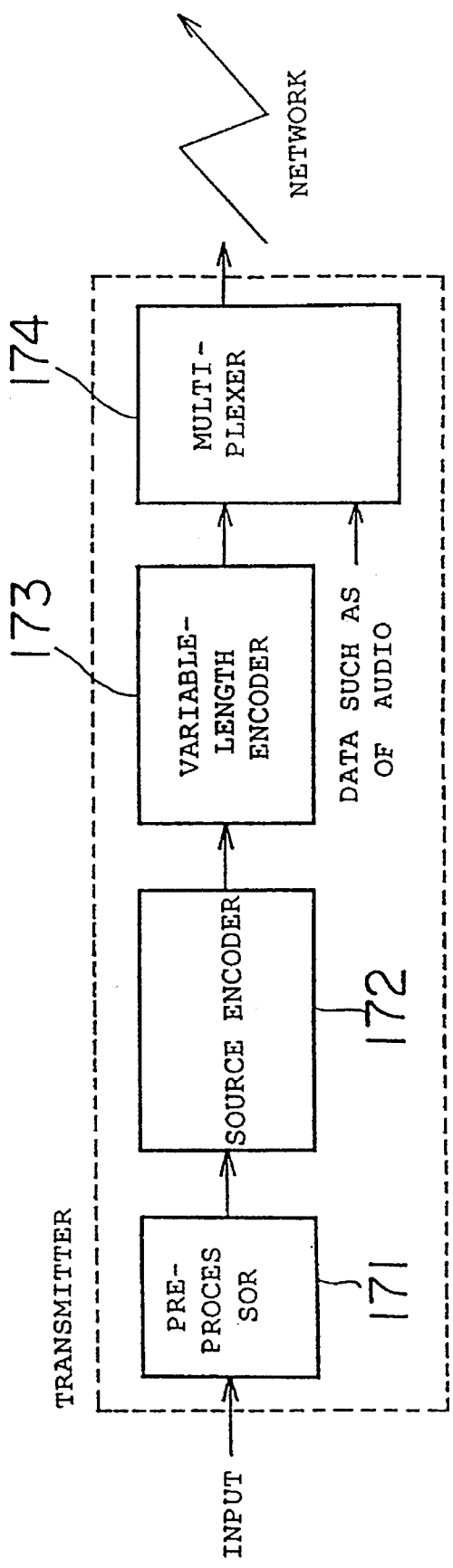
FIG. 1 (A) PRIOR ART

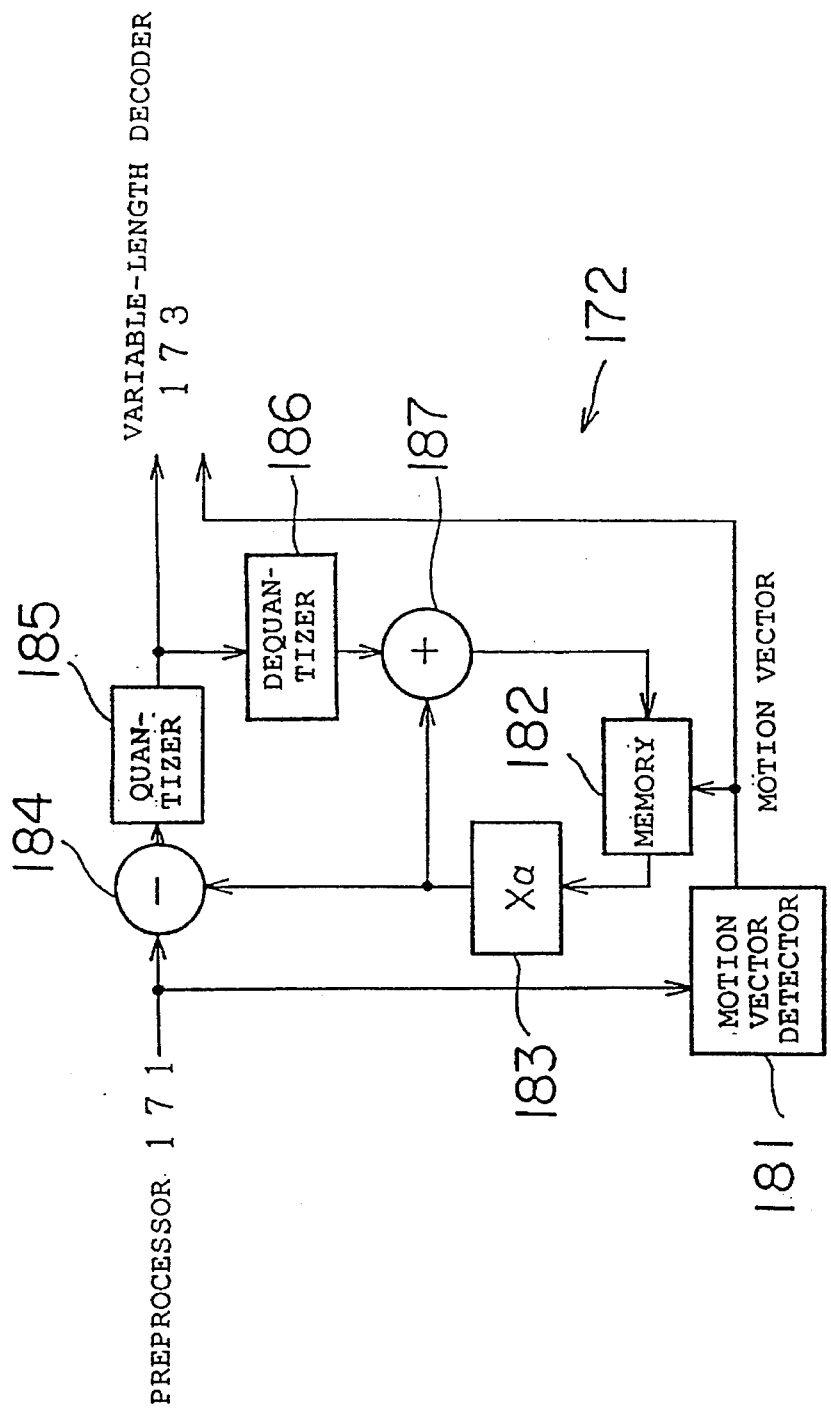
FIG. 2 (A) PRIOR ART

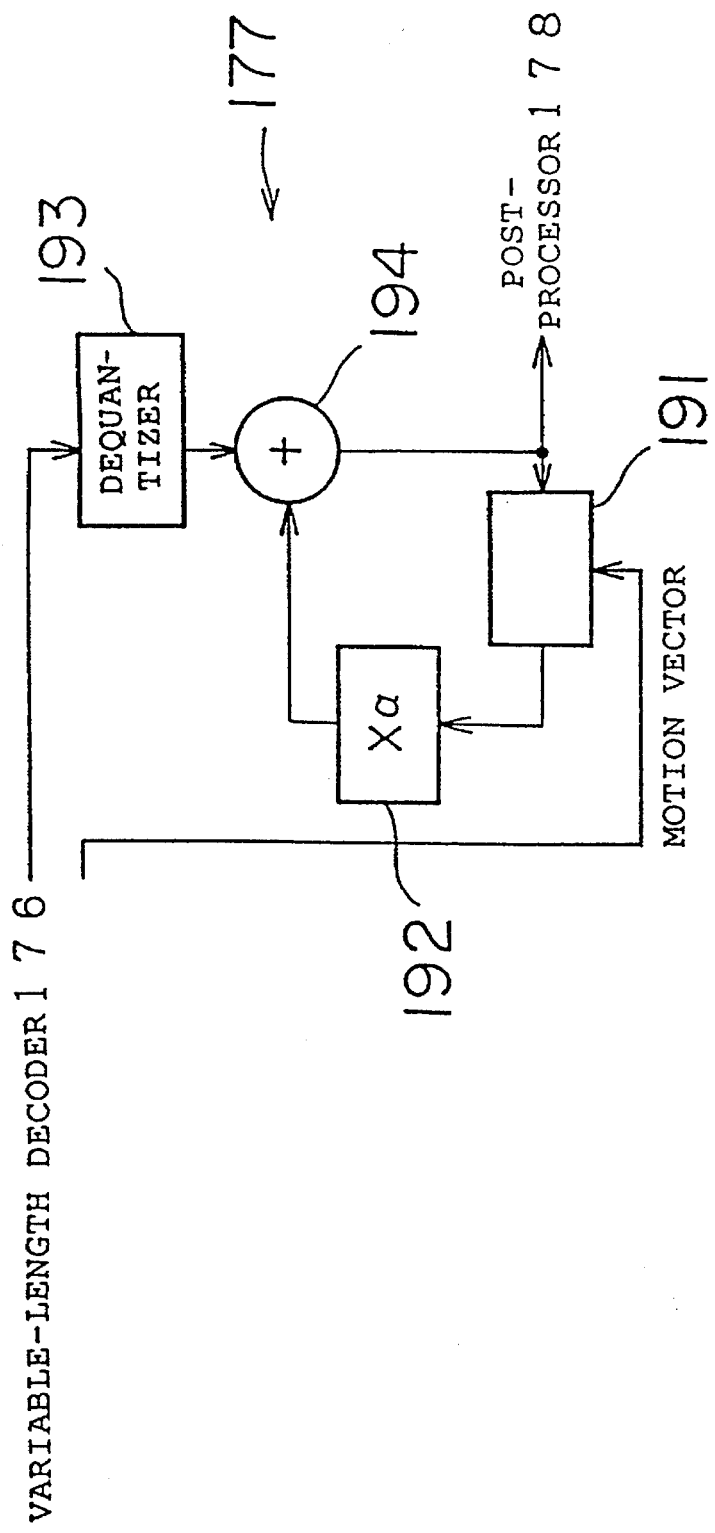
FIG. 2 (B) PRIOR ART

| MOTION VECTOR | AVERAGE | REFERENCE VALUE |
|---|---|---|
| ≠ 0 | X | (X/64)*64 |
| = 0 | X | (X/32)*32 |

F I G. 10 (A)

| MOTION VECTOR | AVERAGE | REFERENCE VALUE |
|---|---|---|
| ≠ 0 | / | −128 |
| = 0 | X | (X/32)*32 |

F I G. 10 (B)

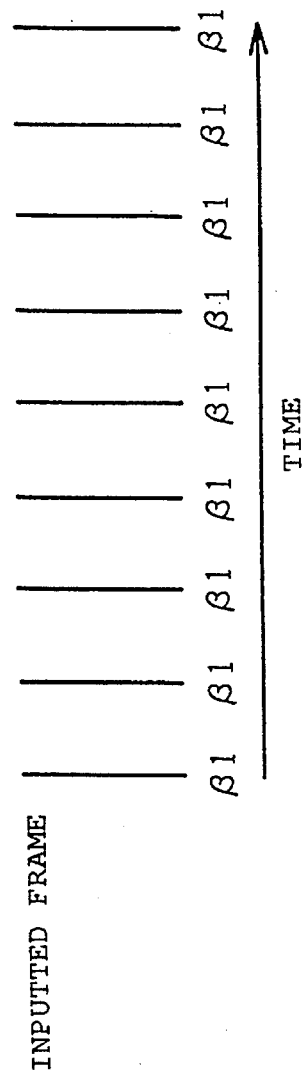
FIG. 11(A) INPUTTED FRAME
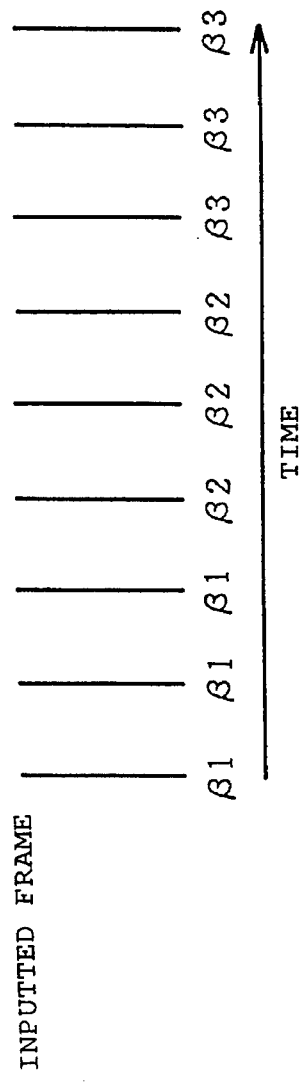
FIG. 11(B) INPUTTED FRAME
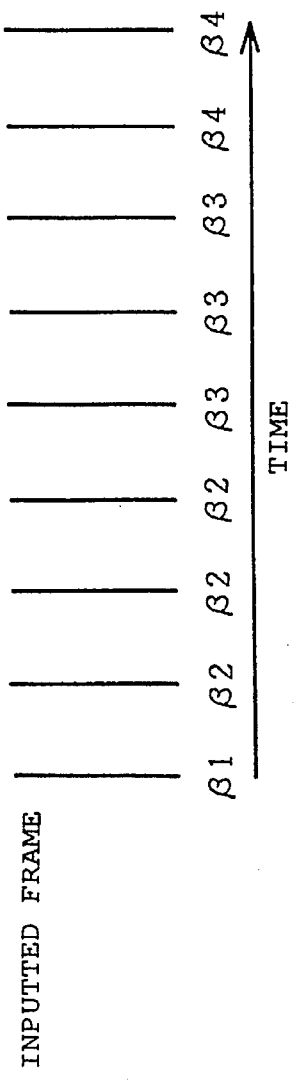
FIG. 11(C) INPUTTED FRAME

FIG. 14(A)
ENCODER A

| β1 | β1 | β1 | β1 |
|----|----|----|----|
| β1 | β2 | β2 | β1 |
| β1 | β2 | β2 | β1 |
| β2 | β2 | β2 | β2 |

FIG. 14(B)
ENCODER B

| β3 | β3 | β3 | β3 |
|----|----|----|----|
| β3 | β4 | β4 | β3 |
| β3 | β4 | β4 | β3 |
| β4 | β4 | β4 | β4 |

SW1 ——— REFERENCE VALUE FOR AREA 1
SW2 ——— REFERENCE VALUE FOR AREA 2
 ·
 ·
 ·
SWn ——— REFERENCE VALUE FOR AREA n

FIG. 19

DIGITAL IMAGE COMMUNICATION APPARATUS

TECHNICAL FIELD

The present invention relates to a digital image communication apparatus, and more particularly to encoding and decoding systems for a digital image communication apparatus which transmits and receives signals that are interframe-encoded using leaky prediction.

BACKGROUND ART

Digital transmission of encoded moving-image television signals having a frequency bandwidth of 4 MHz generally requires a transmission rate of about 100 Mbit/s. Since a primary bit rate in a multiplex digital transmission network is of about 1.5 Mbit/s, for example, it is necessary to encode the above television signals highly efficiently in order to transmit the encoded television signals in the multiplex digital transmission network.

A digital image communication apparatus according to the present invention effects interframe encoding for encoding only image changes between frames and transmitting the encoded image information.

FIGS. 1(A) and 1(B) of the accompanying drawings are schematic block diagrams of an overall arrangement of a conventional digital image communication apparatus. FIG. 1(A) shows a transmitter of the conventional digital image communication apparatus, and FIG. 1(B) shows a receiver of the conventional digital image communication apparatus. In the transmitter, a preprocessor 171 converts an input image signal into a digital image signal and filters the image signal, and a next source encoder 172 suppresses the redundancy of the image. A variable-length encoder 173 assigns a code of a short bit length, i.e., a so-called variable-length code, to data which are generated highly frequently. Finally, a multiplexer 174 multiplexes the variable-length code and data such as audio, and outputs the multiplexed data to a network.

The receiver effects a process which a reversal of the process carried out by the transmitter, using a demultiplexer 175, a variable-length decoder 176, a source decoder 177, and a postprocessor 178, and outputs a reproduced image.

The source encoder 172 effects an interframe encoding process for storing a preceding frame (frame), comparing a new present frame with the preceding frame, and encoding only an area where the image has changed, in order to reduce the number of transmitted bits with respect to an area where no image motion occurs in the frame. In this interframe encoding process, since the receiver is supplied with only information representing the difference (predictive error) between the preceding frame and the present frame, if a data error or a data slip (cell loss) occurs even once, then the reproduced image in the receiver is and remains degraded continuously. A leaky prediction process is employed to prevent such a drawback. The leaky prediction process is a process of determining a predictive error after the data of the preceding image is multiplied by a leak coefficient $\alpha$ ($0<\alpha<1$). When the leaky prediction process is carried out, the effect of a deterioration of the reproduced image in the past converges to 0 with time for automatic recovery from such a deterioration of the reproduced image.

The internal structures of the source encoder 172 and the source decoder 177 will be described in detail below with reference to FIGS. 2(A) and 2(B) of the accompanying drawings. FIG. 2(A) shows the source encoder 172 and FIG. 2(B) shows the source decoder 177. The source encoder 172 effects a motion compensation leaky prediction process.

In the source encoder 172, a motion vector detector 181 checks each of a plurality of areas of the preceding frame to search for an area which is closest to each of the areas of the present frame, based on the present frame data from the preprocessor 171 and the preceding frame data, and detects the difference between the closest areas of the preceding and present frames as a motion vector. The motion vector is outputted to the variable-length encoder 173 and a memory 182. The memory 182 stores the data of each area of the preceding frame. The data of the area of the preceding image which is associated with the area of the present image that is indicated by the supplied motion vector are read from the memory 182 and delivered to a multiplier 183. The multiplier 183 multiplies the supplied data by a leak coefficient a ($0<a<1$), and outputs the product data to a subtractor 184. The subtractor 184 subtracts the output data from the multiplier 183 from the area data of the present frame from the preprocessor 171, producing a predictive error. The predictive error is quantized in predetermined steps by a quantizer 185, and the quantized predictive error is outputted to the variable-length encoder 173.

The quantized predictive error is converted back, or dequantized, to the original predictive error by a dequantizer 186, and the output data from the multiplier 183 are added to the original predictive error by an adder 187. By this addition, the present frame data supplied from the preprocessor 171 are restored, and then newly stored as preceding frame data in the memory 182 in preparation for a next cycle of processing. The memory 182 now stores the preceding frame data which contain a quantization error that are identical to the preceding frame data stored in the receiver.

In the source decoder 177 in the receiver, when a motion vector is supplied from the variable-length decoder 176, the data of the area of the preceding image which is associated with the area of the present image that is indicated by the supplied motion vector are read from a memory 191, and the read data are multiplied by the leak coefficient $\alpha$ by a multiplier 192. A quantized predictive error outputted from the variable-length decoder 176 is dequantized back to its original predictive error by a dequantizer 193. Then, the original predictive error is added to the frame data as multiplied by the leak coefficient $\alpha$ by an adder 194. This addition produces decoded data of the present frame, which are outputted to the postprocessor 178. The memory 191 now newly stores the decoded data of the present frame as preceding frame data in preparation for a next cycle of processing.

Images transmitted by the digital image communication apparatus which effects the above predictive encoding process are supposed to experience limited image motions in the frames. For such images, the encoding efficiency is increased based on the fact that the predictive errors between the data of preceding and present frames essentially concentrate nearly on 0.

With the leaky prediction, however, there occurs a phenomenon in which the predictive errors do not necessarily concentrate nearly on 0. Such a phenomenon will be described below with reference to FIGS. 3(A) and 3(B). FIGS. 3(A) and 3(B) are graphs showing predictive errors that are produced by the multiplication by the leak coefficient $\alpha$ when the data of the preceding frame and the data of the present frame are equal to each other (there is no motion of images).

It is assumed that an analog input image signal is converted to an 8-bit digital image, i.e., a digital image having 256 levels, i.e., a range (numerical ranges) of 0~255, for example, by the preprocessor 171 shown in FIG. 1(A).

FIG. 3(A) shows a predictive error that is produced by the subtractor 184 shown in FIG. 2(A) in such a case. Since the data of the preceding frame and the data of the present frame are equal to each other, the predictive error should be 0 irrespective of the data level in the absence of the multiplication by the leak coefficient α. However, because the multiplication by the leak coefficient α is carried out, the predictive error does not become 0 at the other data levels than the data level 0.

The predictive error can be expressed by the following equation:

Predictive error=the data level of the present frame−the data level of the preceding frame×α.

FIG. 3(B) shows a predictive error produced when an analog input image signal is converted to a digital image signal with the range corrected into a range −128~127 (in which the number of the range level 256 is not varied).

In each of FIGS. 3(A) and 3(B), the predictive error becomes large as the level of the data (preceding frame data) multiplied by the leak coefficient departs from 0. Stated otherwise, those images which are composed of many data whose data levels depart from 0 have a problem in that the encoding efficiency is greatly lowered by the leaky prediction.

DISCLOSURE OF THE INVENTION

It is therefore an object of the present invention to provide a digital image communication apparatus which suppresses any reduction in the encoding efficiency due to the leaky prediction.

To achieve the above object, there is provided an encoding system for a digital image communication apparatus for establishing an appropriate data range to reduce a predictive error caused by leaky prediction.

The encoding system for the digital image communication apparatus has memory means for storing digital image data of an inputted preceding frame, reference value outputting means for outputting a reference value for a range correction, range correcting means for correcting a range with respect to the digital image data of the preceding frame stored in the memory means according to the reference value outputted by the reference value outputting means, leak coefficient multiplying means for multiplying the data corrected by the range correcting means by a predetermined leak coefficient and outputting product data, uncorrecting means for uncorrecting the data outputted from the leak coefficient multiplying means to restore the range corrected by the range correcting means, predictive error outputting means for detecting the difference between inputted digital image data of a present frame and the data uncorrected by the uncorrecting means, and outputting the detected difference as a predictive error, and predictive error encoding means for encoding the predictive error outputted from the predictive error outputting means in a predetermined manner and outputting the encoded predictive error.

The reference value outputting means determines and outputs a reference value depending on the digital image data in an area of the preceding frame which is associated with the area of the present image that is indicated by a motion vector, among the digital image data of the preceding frame stored in the memory means, and the range correcting means corrects the range of the digital image data in an area of the preceding frame which is associated with the area of the present image that is indicated by a motion vector, among the digital image data of the preceding frame stored in the memory means, according to the reference value determined by the reference value outputting means.

BRIEF DESCRIPTION OF THE DRAWINGS

FIG. 2(A) is a diagram showing an internal structure of a source encoder;

FIG. 2(B) is a diagram showing an internal structure of a source decoder;

FIG. 10(A) is a diagram illustrative of a first example of a process for calculating a table stored in an ROM;

FIG. 10(B) is a diagram illustrative of a second example of a process for calculating a table stored in an ROM;

FIG. 11(A) is a diagram illustrative of a first example of timing of updating a reference value;

FIG. 11(B) is a diagram illustrative of a second example of timing of updating a reference value;

FIG. 11(C) is a diagram illustrative of a third example of timing of updating a reference value;

FIG. 14(A) is diagram illustrative of a range correction for an encoder A;

FIG. 14(B) is diagram illustrative of a range correction for an encoder B;

FIG. 19 is a diagram showing switches of the reference value determing function unit;

BEST MODE FOR CARRYING OUT THE INVENTION

Figure 4:
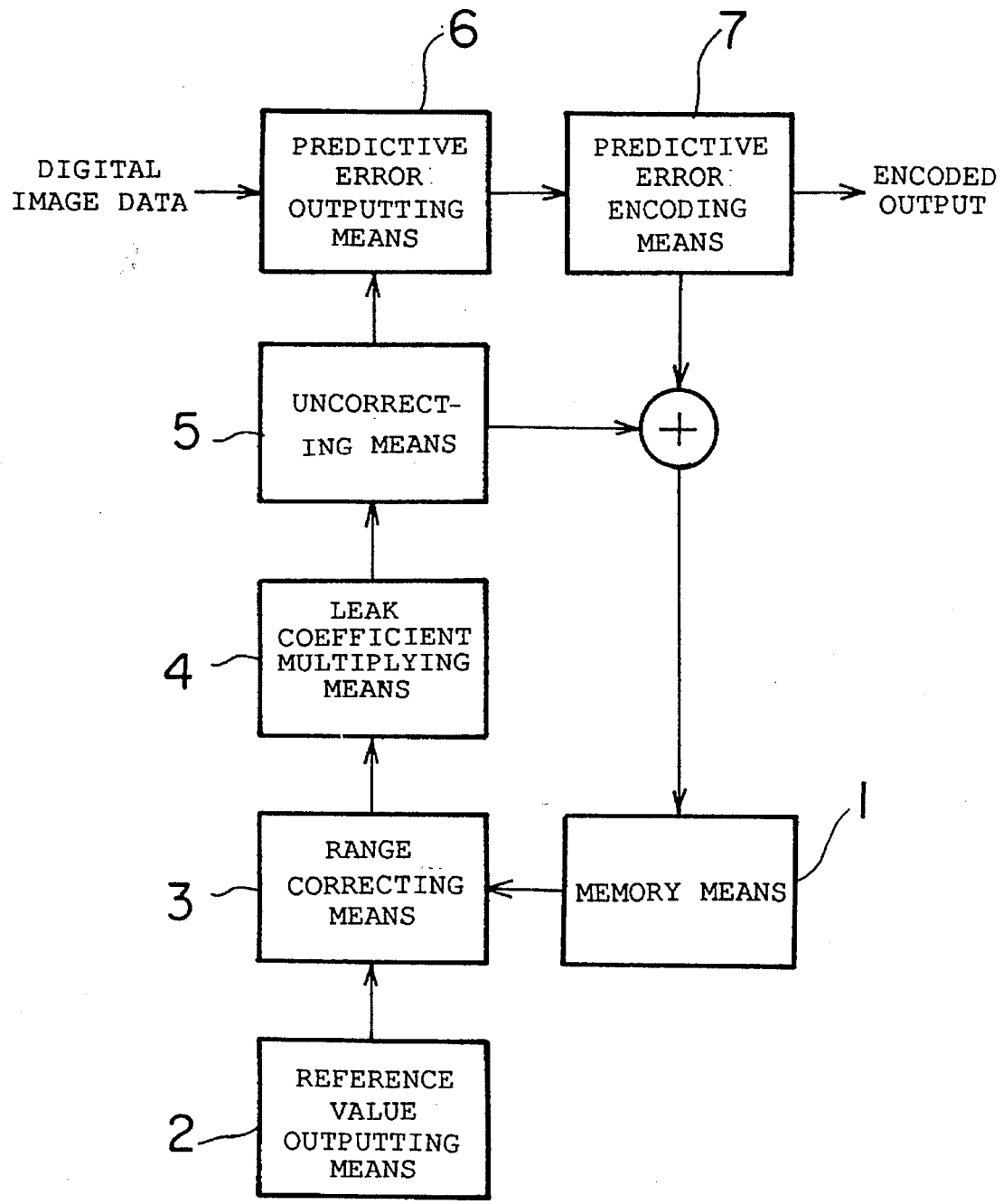
FIG. 4 is a diagram illustrative of the principles of the present invention.

Prior to describing embodiments of the present invention, the principles of the present invention will first be described below with reference to FIG. 4.

An encoding system for a digital image communication apparatus according to the present invention has a memory means 1 for storing digital image data of an inputted preceding frame, a reference value outputting means 2 for outputting a reference value for a range correction, a range correcting means 3 for correcting a range with respect to the digital image data of the preceding frame stored in the memory means 1 according to the reference value outputted by the reference value outputting means 2, a leak coefficient multiplying means 4 for multiplying the data corrected by the range correcting means 3 by a predetermined leak coefficient and outputting the product data, an uncorrecting means 5 for uncorrecting the data outputted from the leak coefficient multiplying means 4 to restore the range corrected by the range correcting means 3, a predictive error outputting means 6 for detecting the difference between inputted digital image data of a present frame and the data uncorrected by the uncorrecting means 5, and outputting the detected difference as a predictive error, and a predictive error encoding means 7 for encoding the predictive error outputted from the predictive error outputting means 6 in a predetermined manner and outputting the encoded predictive error.

Figure 1:
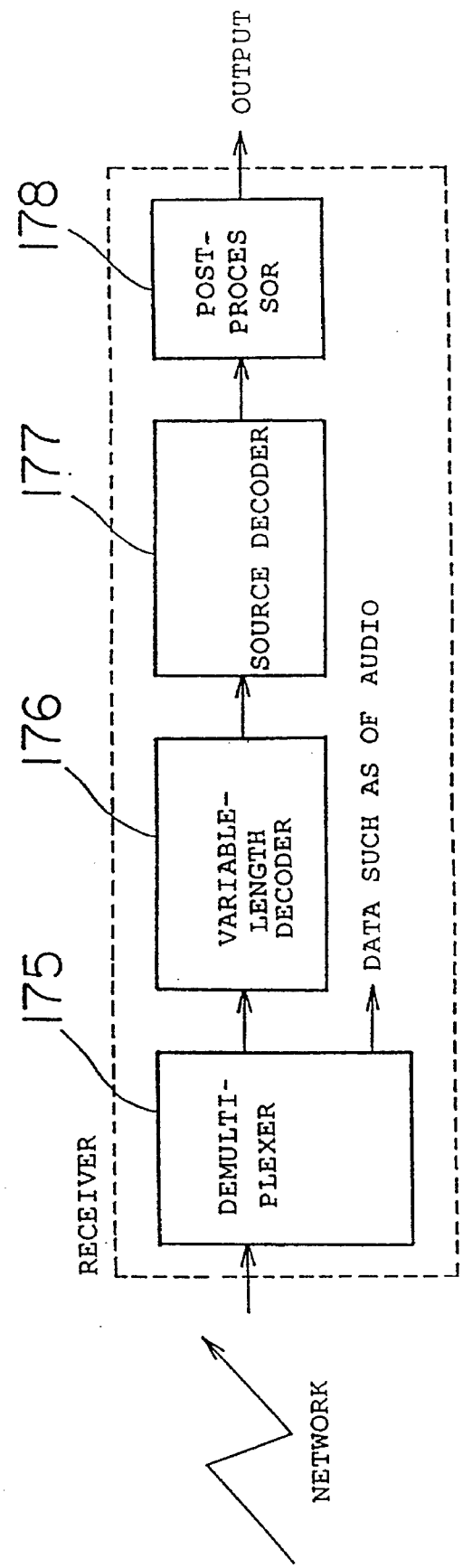
FIG. 1(A) is a block diagram showing a schematic arrangement of a transmitter of a conventional digital image communication apparatus.
FIG. 1(B) is a block diagram showing a schematic arrangement of a receiver of the conventional digital image communication apparatus.
Figure 3A:
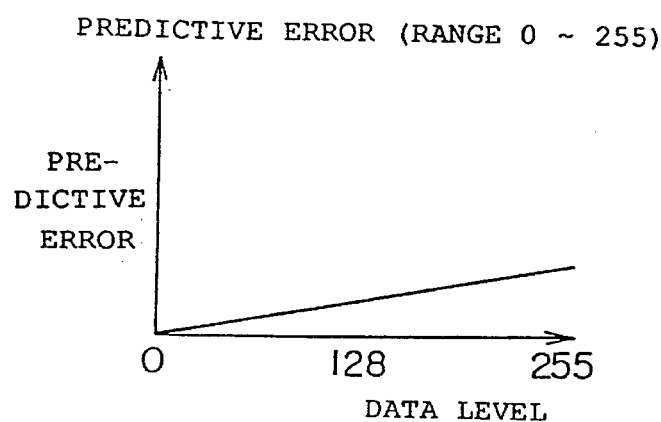
FIG. 3(A) is a graph showing a predictive error produced by a subtractor shown in FIG. 2(A)
Figure 3B:
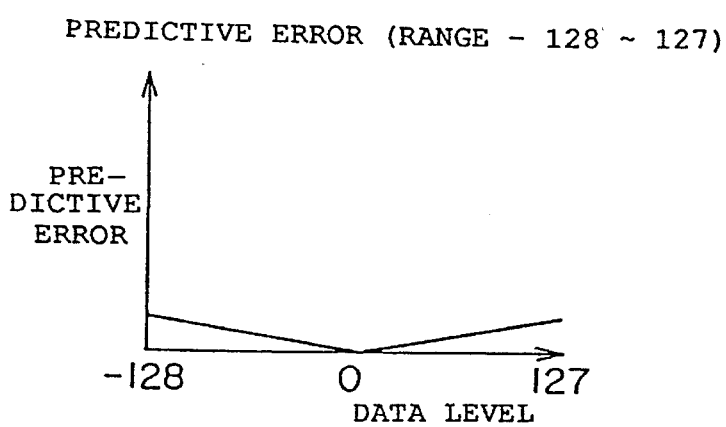
FIG. 3(B) is a graph showing a predictive error produced when an analog input image signal is converted to a digital image signal with the range corrected into a range −128~127.
Figure 3C:
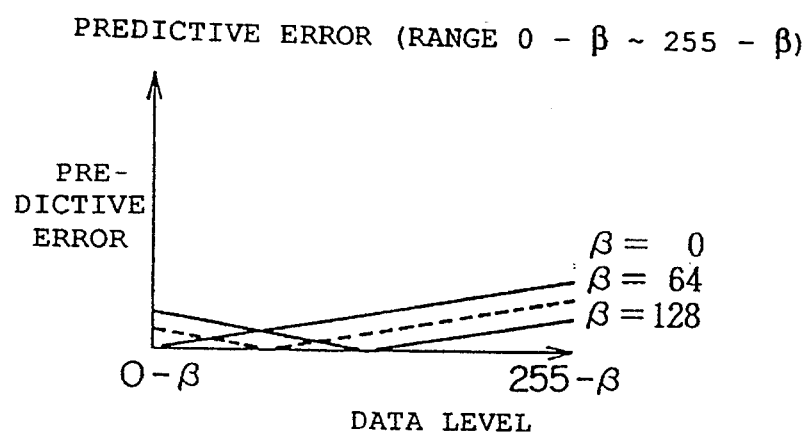
FIG. 3(C) is a graph showing a predictive error produced when an analog input image signal is converted to a digital image signal with the range corrected into a range (0−β)~(255−β) with β being a reference value.

According to the present invention, a range (numerical range) is corrected depending on the data level of a preceding frame to equalize the data (preceding frame data) multiplied by a leak coefficient to 0. More specifically, as shown in FIG. 3(C), the range is corrected into a range $(0-\beta) \sim (255-\beta)$ with $\beta$ being a reference value. For example, if the data level (average or maximum frequency data) of a corresponding area in a preceding frame is 128, then the range is corrected into a range $-128 \sim 127$ with $\beta=128$. In this manner, the predictive error is reduced to prevent the encoding efficiency from being lowered.

The above process will be described below with respect to the arrangement shown in FIG. 4. The range correcting means 3 corrects the range of the data of the preceding frame stored in the memory means 1 according to the reference value outputted from the reference value outputting means 2, and thereafter the leak coefficient multiplying means 4 multiplies the data by the predetermined leak coefficient and outputs the multiplied data.

The uncorrecting means 5 uncorrects the data outputted from the leak coefficient multiplying means 4 to restore the range corrected by the range correcting means 3, and the predictive error outputting means 6 detects the difference between the inputted digital image data of the present frame and the data uncorrected by the uncorrecting means 5, and outputs the detected difference as a predictive error. The predictive error encoding means 7 encodes the predictive error outputted from the predictive error outputting means 6 and outputs the encoded predictive error.

Embodiments of the present invention will be described below with reference to the drawings.

Figure 5A:
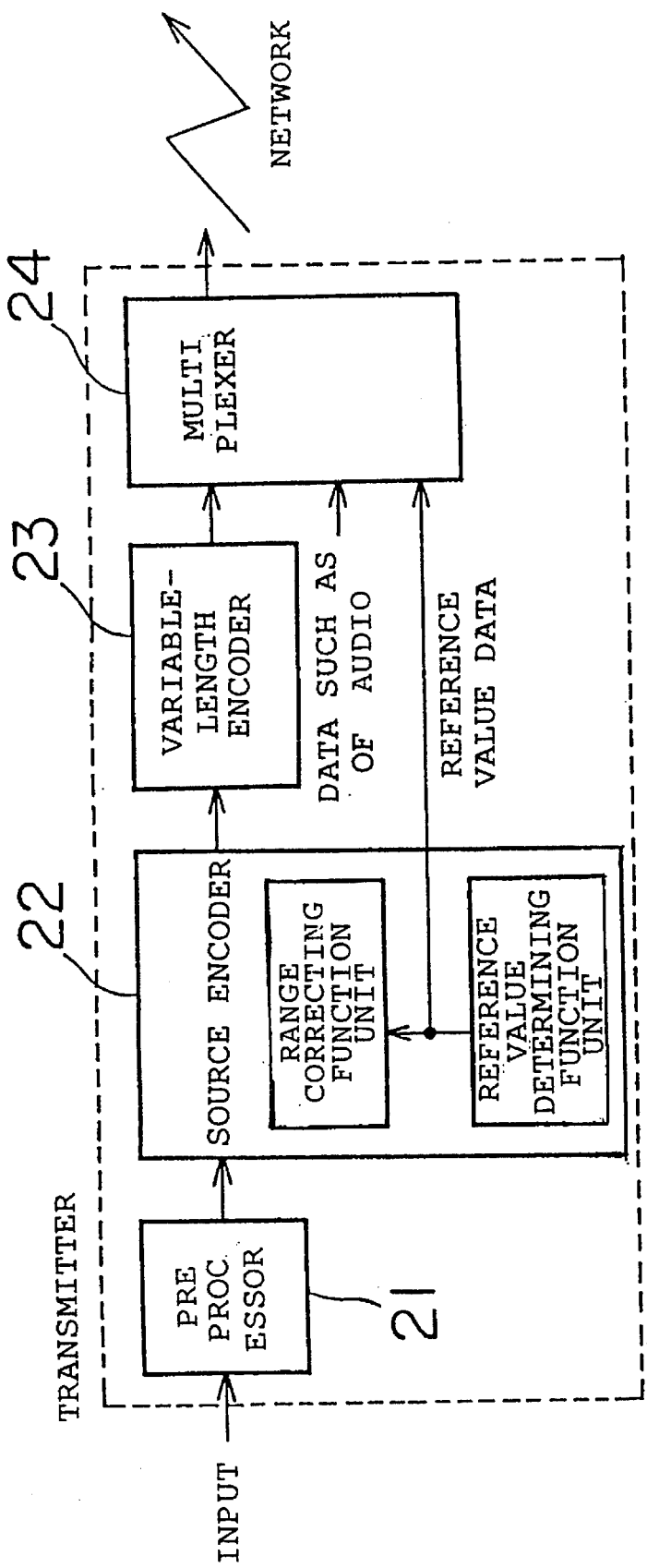
FIG. 5(A) is a block diagram showing a schematic arrangement of a transmitter of a digital image communication apparatus according to a first embodiment of the present invention.

FIGS. 5(A) and 5(B) are block diagrams showing schematic arrangements of a transmitter and a receiver, respectively, of a digital image communication apparatus according to a first embodiment of the present invention. In the first embodiment, a reference value for correcting the range, which is determined by the transmitter, is transmitted to the receiver.

In the transmitter, a preprocessor 21 converts an input image signal into a digital image signal and filters the image signal, and a next source encoder 22 suppresses the redundancy of the image (data compression). By the analog-to-digital conversion, the analog input image signal is sampled and converted into digital data having a predetermined range of 0~255, for example. A variable-length encoder 23 assigns a code of a short bit length, i.e., a so-called variable-length code, to data which are generated highly frequently. Finally, a multiplexer 24 multiplexes the variable-length code and data such as of audio, and outputs the multiplexed data to a network.

The source encoder 22 effects interframe encoding including leaky prediction. The source encoder 22 has a reference value determining function and a range correction function as described later on. The multiplexer 24 multiplexes reference value data determined by the reference value determining function of the source encoder 22, a variable-length code, and data such as of audio, and outputs the multiplexed data to the network.

The receiver effects a process which is a reversal of the process carried out by the transmitter, using a demultiplexer 25, a variable-length decoder 26, a source decoder 27, and a postprocessor 28, and outputs a reproduced image.

Figure 6:
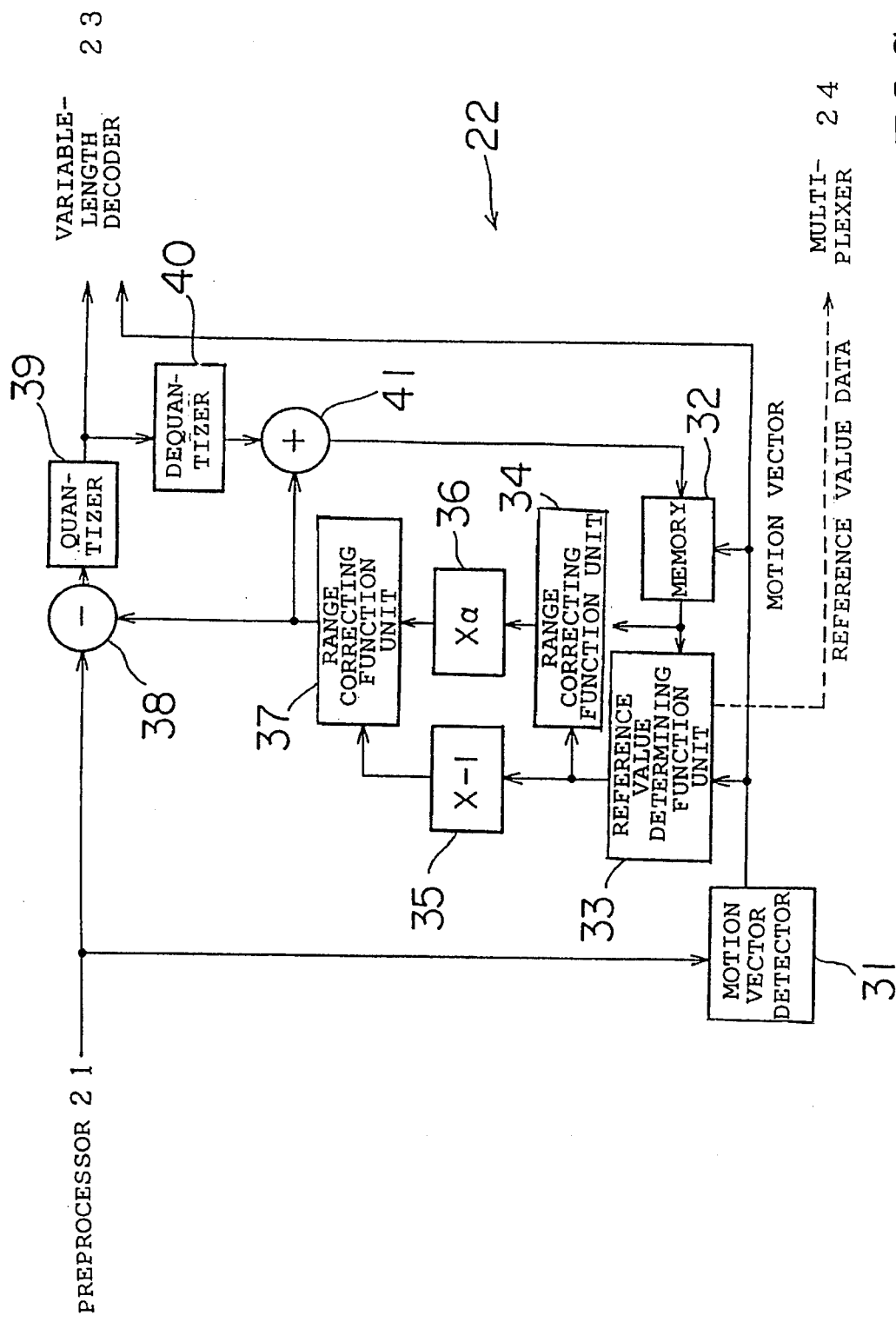
FIG. 6 is a block diagram showing a detailed internal structure of a source encoder according to the first embodiment of the present invention.

FIG. 6 is a block diagram showing a detailed internal structure of a source encoder according to a first embodiment of the present invention. In this first embodiment, a correction for moving/still image adaptation is carried out using a motion vector.

In the source encoder 22, a motion vector detector 31 checks each of a plurality of areas of the preceding frame to search for an area which is closest to each of the areas of the present frame, based on the data of each area, which is of 8×8 pixels, of the present frame from the preprocessor 21, and detects the difference between the closest areas of the preceding and present flames as a motion vector. The motion vector is outputted to the variable-length encoder 23 and also to a memory 32 and a reference value determining function unit 33. The memory 32 stores the data of each area of the preceding frame. The data of the area of the preceding image which is associated with the area of the present image that is indicated by the supplied motion vector are read from the memory 32 and delivered to a range correcting function unit 34 and the reference value determining function unit 33.

The reference value determining function unit 33 determines a quantized reference value β based on the preceding frame data from the memory 32 and the motion vector from the motion vector detector 31, and sends the determined quantized reference value β to the range correcting function unit 34, an inverter 35, and the multiplexer 24. A process of determining the reference value in the reference value determining function unit 33 will be described later on with reference to FIGS. 8 through 10(A) and 10(B).

The range correcting function unit 34 corrects the range of the preceding frame data read from the memory 32 with the reference value β determined by the reference value determining function unit 33.

Figure 7:
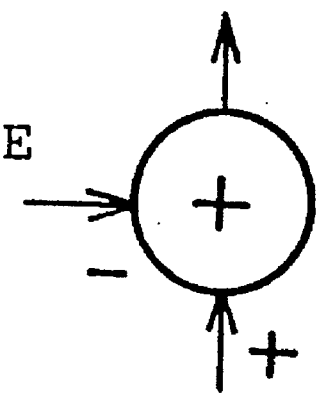
FIG. 7 is a diagram illustrative of a range correction carried out by a range correcting function unit.

FIG. 7 is a diagram illustrative of the range correcting function of the range correcting function unit 34. If the range of the data of an inputted preceding frame read from the memory 32 is of 0–255, for example, then when the reference value β=255 is inputted, the range correcting function unit 34 adds −255 and outputs data having a corrected range of −255–0. The range correcting function unit 34 can be implemented by a simple arrangement for adding a reference value to input data.

Turning back to FIG. 6, a multiplier 36 which is supplied with the output data from the range correcting function unit 34 multiplies the supplied data by a leak coefficient α (0<a<1), and outputs the product data to a range correcting function unit 37. The reference value β is inverted by the inverter 35 and supplied as −β to the range correcting function unit 37. The range correcting function unit 37 operates in the same manner as the range correcting function unit 34, i.e., adds β to the range of the data, which have been multiplied by the leak coefficient, from the multiplier 36. The range corrected by the range correcting function unit 34 is now uncorrected back into the original range.

The output data from the range correcting function unit 37 are sent to a subtractor 38 and an adder 41. The subtractor 38 subtracts the output data from the range correcting function unit 37 from the present frame data from the preprocessor 21, producing a predictive error. The predictive error is quantized in predetermined steps by a quantizer 39, and the quantized predictive error is outputted to the variable-length encoder 23.

The quantized predictive error is converted back, or dequantized, into the original predictive error by a dequantizer 40, and the output data from the range correcting function unit 37 are added to the original predictive error by an adder 41. By this addition, the present frame data supplied from the preprocessor 21 are restored, and then newly stored as preceding frame data in the memory 32 in preparation for a next cycle of processing.

Figure 8:
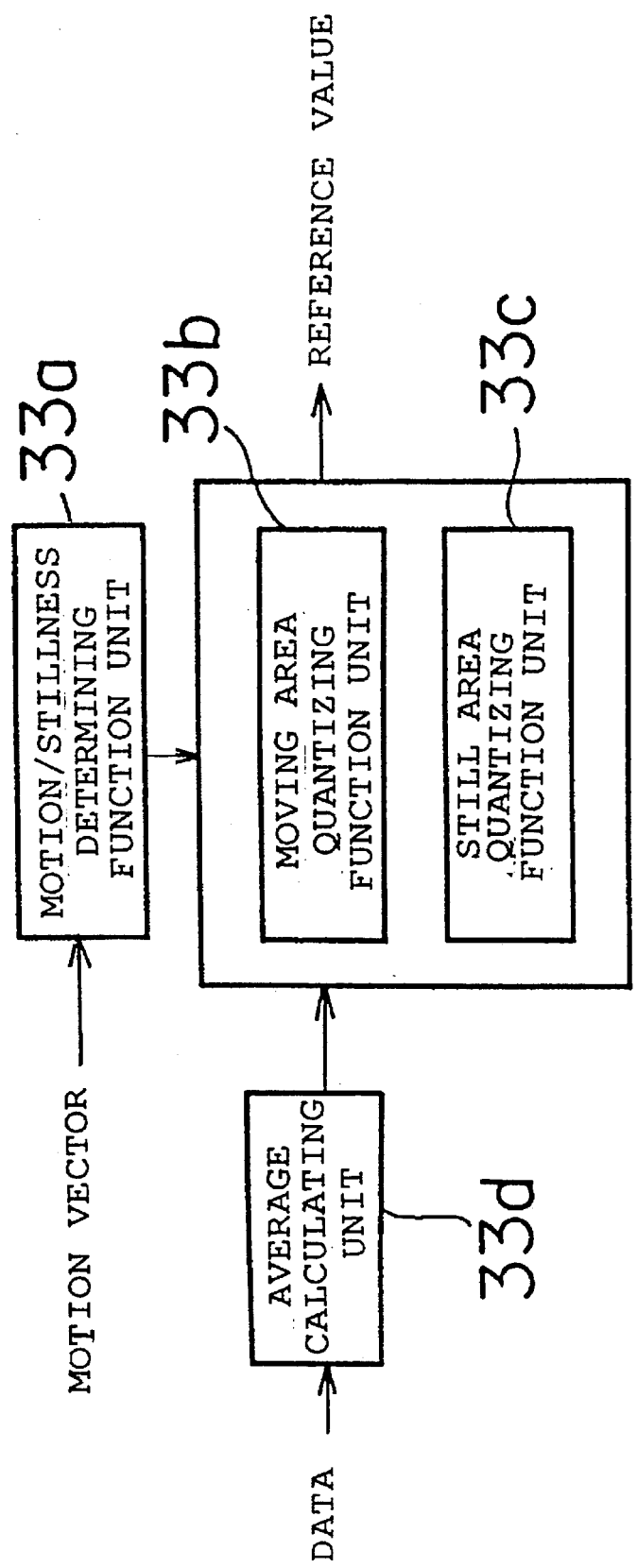
FIG. 8 is a diagram showing functions of a reference value determining function unit.

FIG. 8 is a diagram showing functions of the reference value determining function unit 33. When an image moves, the difference between the data of a preceding frame and the data of a present frame is large, and any effect of the drawback of leaky prediction is small. Therefore, the quantization of a reference value may be made in greater steps for increasing the encoding efficiency. In view of this, the reference value determining function unit 33 varies the number of steps for the quantization of a reference value depending on the motion of the image.

More specifically, a motion/stillness determining function unit 33a determines whether an image is moving or still based on the motion vector from the motion vector detector 31. Based on the result of decision by the motion/stillness determining function unit 33a, a moving area quantizing function unit 33b or a still area quantizing function unit 33c is selected. The data read from the memory 32 are averaged by an average calculating unit 33d, and the averaged data are supplied to the moving area quantizing function unit 33b and the still area quantizing function unit 33c. The moving area quantizing function unit 33b or the still area quantizing function unit 33c quantizes the preceding frame data in a greater or smaller numbers of steps, and outputs the quantized data as a reference value β.

Figure 9:
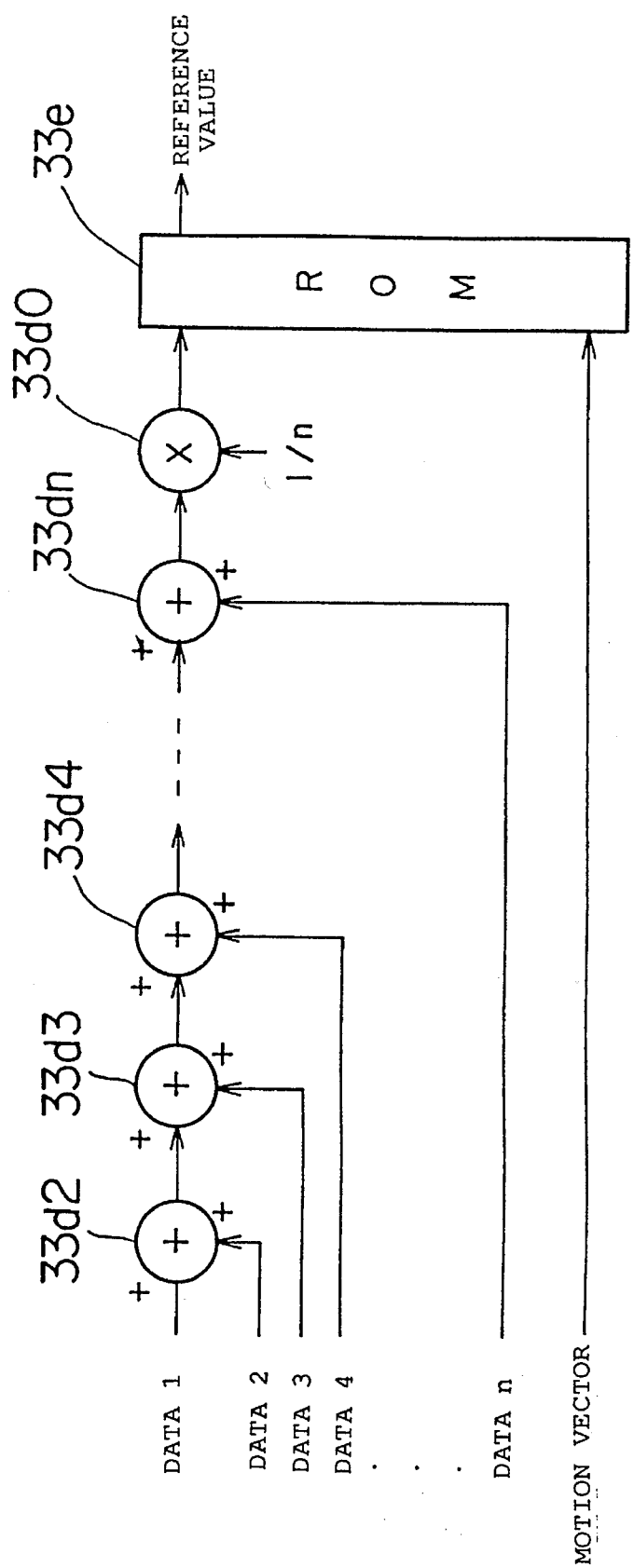
FIG. 9 is a diagram showing a structure of the reference value determining function unit.

FIG. 9 is a diagram showing a structure of the reference value determining function unit 33. It is assumed that the number of data in an area of the preceding frame is n. Adders 33d2~33dn and a multiplier 33d0 correspond to the average calculating unit 33d shown in FIG. 8.

The adders 33d2~33dn successively add the data 1~n of the preceding frame to determine a data sum, and the multiplier 33d0 multiplies the data sum by 1/n, thus calculating the average of the data 1~n of the preceding frame. The average data are then outputted to an ROM 33e. The ROM 33e correspond to the motion/stillness determining function 33a, the moving area quantizing function unit 33b, and the still area quantizing function unit 33c shown in FIG. 8. The ROM 33e stores a table of quantized reference values in relation to average values and motion vectors. Depending on an average value and a motion vector which have been inputted, a quantized reference value is read from the table.

FIGS. 10(A) and 10(B) are diagrams showing two examples of a process of calculating the table stored in the ROM 33e. In each of the examples, the number of steps for quantizing a reference value is varied depending on whether the motion vector is 0 or not. The ROM 33e stores a table composed of specific numerical values calculated according to the process described below, and an actual number representative of a reference value is read from the table depending on actual numbers representative of a motion vector and an average value which have been inputted.

According to the first example of the process for calculating the table, if the motion vector is not 0 (the moving area quantizing function unit 33b shown in FIG. 8 operates), then the inputted average value x is quantized in 64 steps, and if the motion vector is 0 (the still area quantizing function unit 33c shown in FIG. 8 operates), then the inputted average value x is quantized in 32 steps. Therefore, when the image is not moving and the motion vector is 0 (still area), the reference value is quantized in less steps. In FIGS. 10(A) and 10(B), the symbol "/" indicates a division with any remainder rounded off.

According to the second example of the process for calculating the table, the reference value for moving areas is set to a fixed value. Specifically, if the motion vector is not 0, the reference value is fixed to −128, and if the motion vector is 0, then the inputted average value x is quantized in 32 steps.

As described above, when there is a motion in the image, the number of steps for quantizing the reference value is increased, and when there is no motion in the image, the number of steps for quantizing the reference value is reduced. In this manner, the amount of information is prevented from being increased when the reference value is transmitted to the receiver.

In the reference value determining function unit 33, the number of steps for quantizing the reference value is varied depending on the motion vector. However, the number of steps for quantizing the reference value may be varied by determining whether the image is moving or not based on interframe/intraframe information.

While the reference value is determined at all times to effect a range correction in the reference value determining function unit 33, methods shown in FIG. 11(A) through 11(C) may be employed with a view to reducing the number of times that the reference value is updated for increasing the encoding efficiency.

FIGS. 11(A) through 11(C) show three examples of timing to update the reference value. In FIG. 11(A), the reference value is updated only when the communication starts, and keeps the reference value constant thereafter. In FIG. 11(B), the reference value is not updated for every frame, but updated an every number of frames (every three frames), and the previous reference value is held even if the reference value varies when the reference value is not to be updated. In FIG. 11(C), the reference value is updated in every frame.

Figure 12:
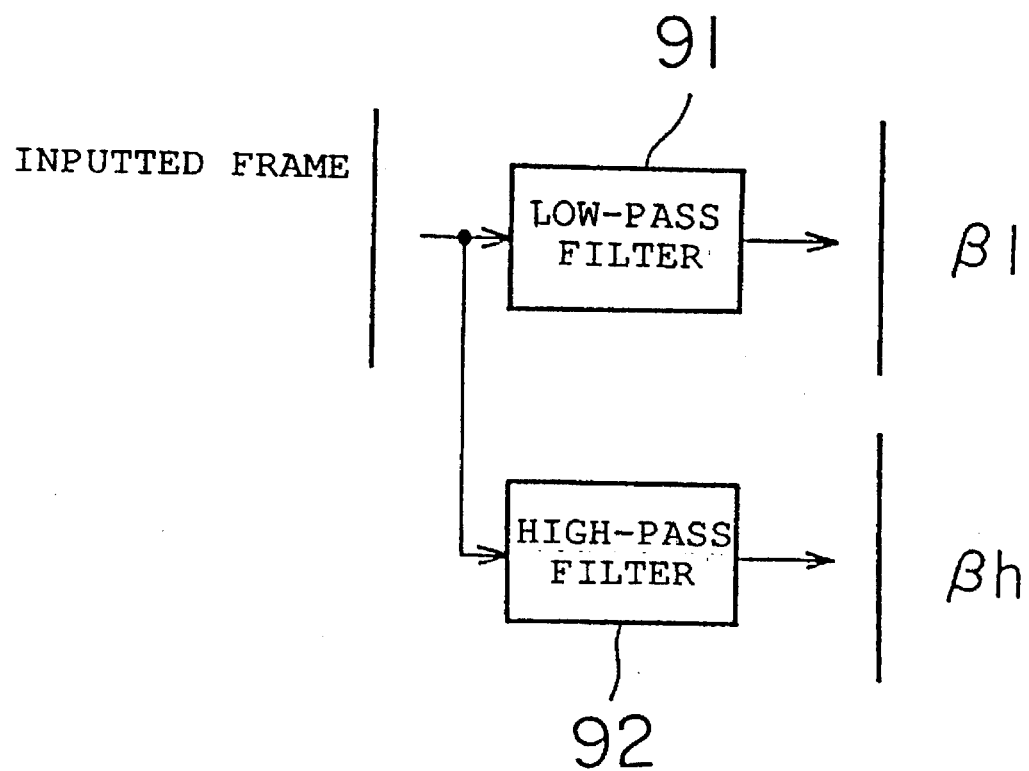
FIG. 12 is a diagram illustrative of a range correction for different frequency bands.

FIG. 12 is a diagram illustrative of a range correction for different frequency bands. In a certain digital image communication apparatus, data of one frame are passed through a low-pass filter 91 to produce a frame including blurred edges, and passed through a high-pass filter 92 to produce a frame composed of only edges. In such a digital image communication apparatus, a reference value $\beta 1$ may be established with respect to the image data that has been passed through the low-pass filter 91, and a reference value $\beta h$ different from the reference value $\beta 1$ may be established with respect to the image data that has been passed through the high-pass filter 92. In the range correction effected for different frequency bands, the reference value may be updated with the timing shown in FIGS. 11(A) through 11(C).

Figure 13:
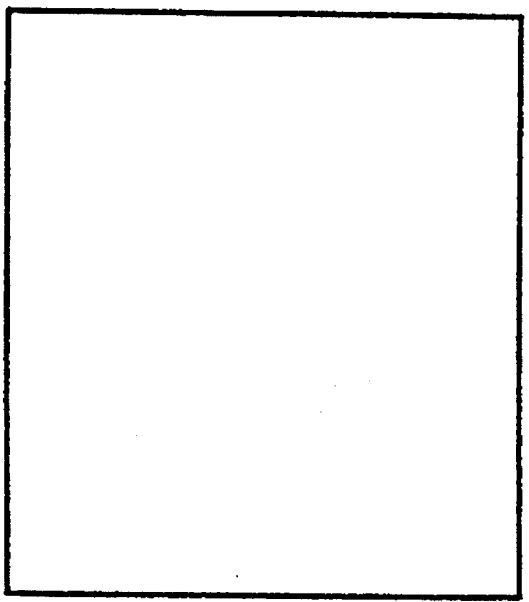
FIG. 13 is a diagram illustrative of a range correction for each area.

FIG. 13 is a diagram illustrative of a range correction for each area. One frame is divided into a plurality of areas, e.g., 16 areas, and a reference value $\beta k$ is established for each of the divided areas. As the number of areas increases, any increase in the predictive error due to the leaky prediction can be suppressed, reducing the number of bits for transmitting the predictive error. However, since the number of bits for transmitting many reference values $\beta$ also increases, it is necessary to balance these considerations in determining the number of areas in order to achieve highly efficient encoding. It is possible that one frame is composed of one frame. In the range correction for each area, the reference value may be updated with the timing shown in FIGS. 11(A) through 11(C), or the range correction for different frequency bands as shown in FIG. 12 may be carried out.

FIGS. 14(A) and 14(B) are diagrams illustrative of range corrections for different encoders. In a video telephone system or a video conference system, the position of a video camera used remains unchanged, and any change in an image captured thereby is small. If there are a plurality of cameras and encoders associated with the cameras, even when the images supplied to the encoders are of different qualities, any time-dependent change of the image supplied to one encoder may be considered as being small. In such a case, the reference value for each encoder may chronologically be fixed to a constant value. More specifically, for an encoder A shown in FIG. 14(A), a reference value $\beta$ is determined and fixed for each area, and for an encoder B shown in FIG. 14(B), a reference value $\beta$ is determined and fixed for each area. With such a fixed reference value $\beta$ for each encoder, it is not necessary to transmit the reference value $\beta$ to the receiver at all times, allowing the encoding efficiency to be increased. In the range corrections for different encoders, the range correction for different frequency bands as shown in FIG. 12 may be carried out.

Figure 5:
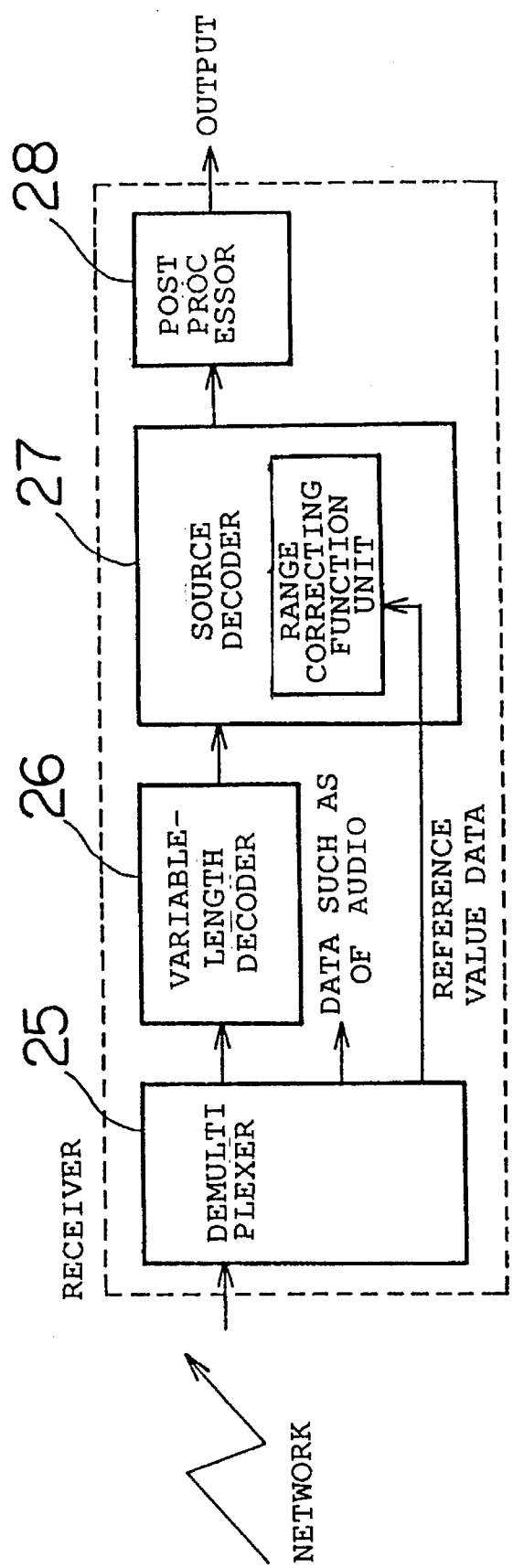
FIG. 5(B) is a block diagram showing a schematic arrangement of a receiver of the digital image communication apparatus according to the first embodiment.
Figure 15:
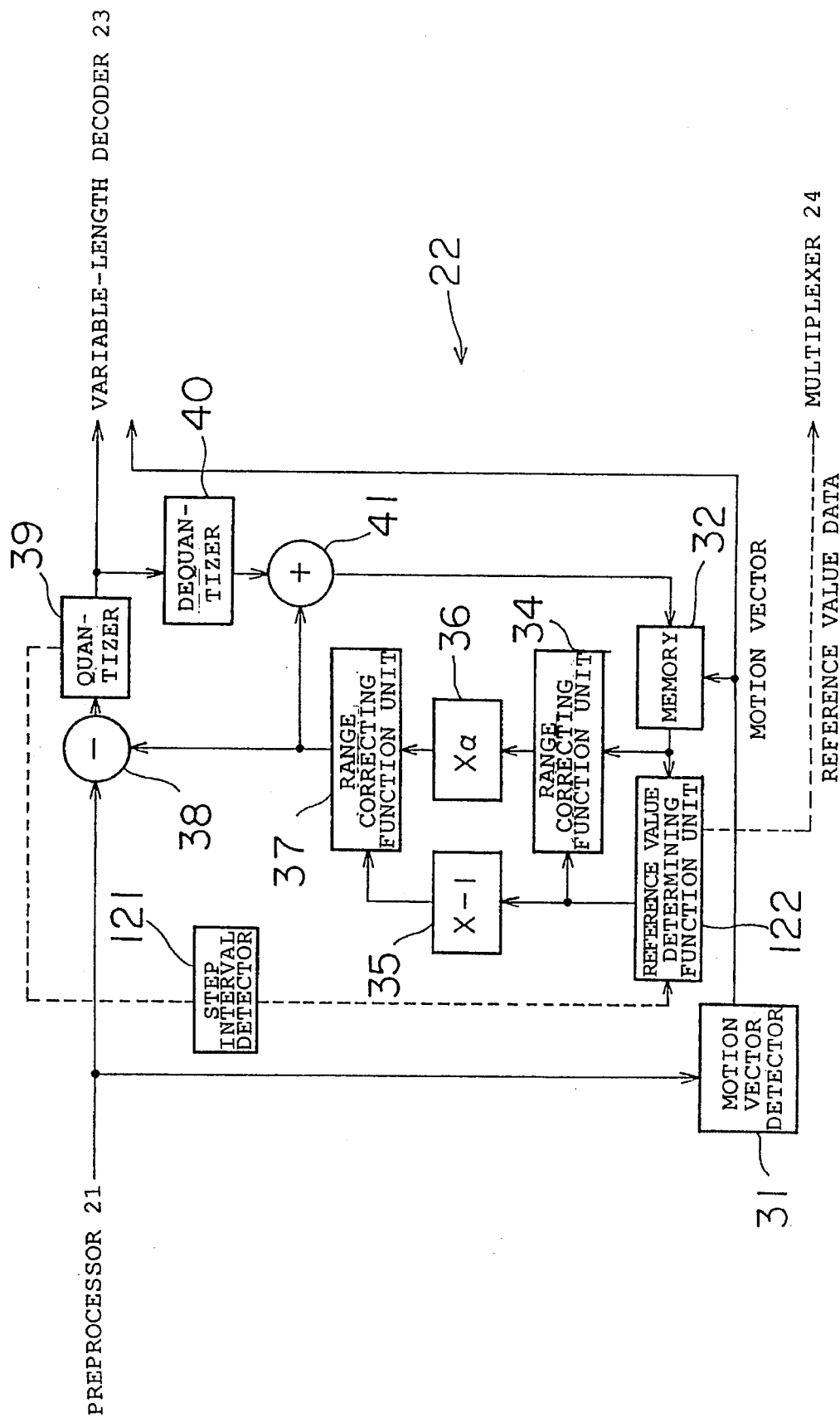
FIG. 15 is a block diagram showing a detailed internal structure of a source encoder according to a second embodiment of the present invention.

FIG. 15 is a block diagram showing a detailed internal structure of a source encoder 22 shown in FIG. 5, according to a second embodiment of the present invention. In this second embodiment, the number of steps for quantizing the reference value is controlled on the basis of the number of quantizing steps used in image encoding (which is executed by the quantizer 39 shown in FIG. 6). Those parts of the source encoder shown in FIG. 15 which are identical to those of the source encoder 22 according to the first embodiment shown in FIG. 6 are denoted by identical reference numerals, and will not be described in detail below.

A step interval detector 121 detects a step interval of quantization carried out in the quantizer 39, and sends the detected step interval to a reference value determining function unit 122. The reference value determining function unit 122 is supplied with data of a preceding frame read from the memory 32, but not with a motion vector from the motion vector detector 31 unlike the source encoder 22 according to the first embodiment.

Figure 16:
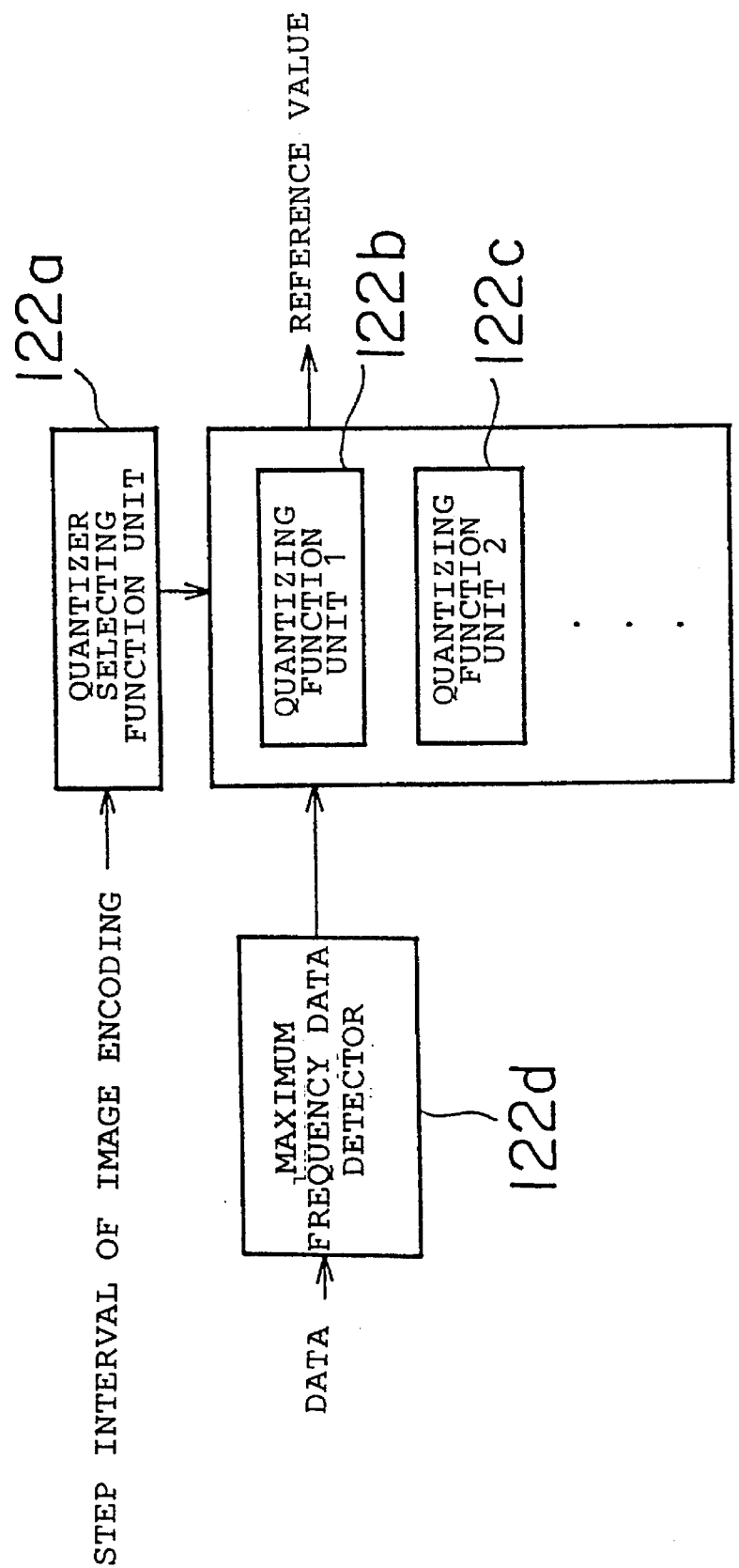
FIG. 16 is a diagram showing functions of a reference value determining function unit.

FIG. 16 is a diagram showing functions of the reference value determining function unit 122. In the reference value determining function unit 122, a quantizer selecting function unit 122a determines a step interval for quantizing the reference value depending on the step interval of quantization effected in the quantizer 39 shown in FIG. 15, and selects one of quantizing function units 122b, 122c, which is capable of quantizing data with the determined step interval. A maximum frequency data detector 122d detects data of maximum frequency among the data read from the memory 32, and sends the detected data as a reference value to the quantizing function units 122b, 122c. The selected one of the quantizing function units 122b, 122c, quantizes the supplied data, and outputs the quantized data as a quantized reference value $\beta$.

Figure 17:
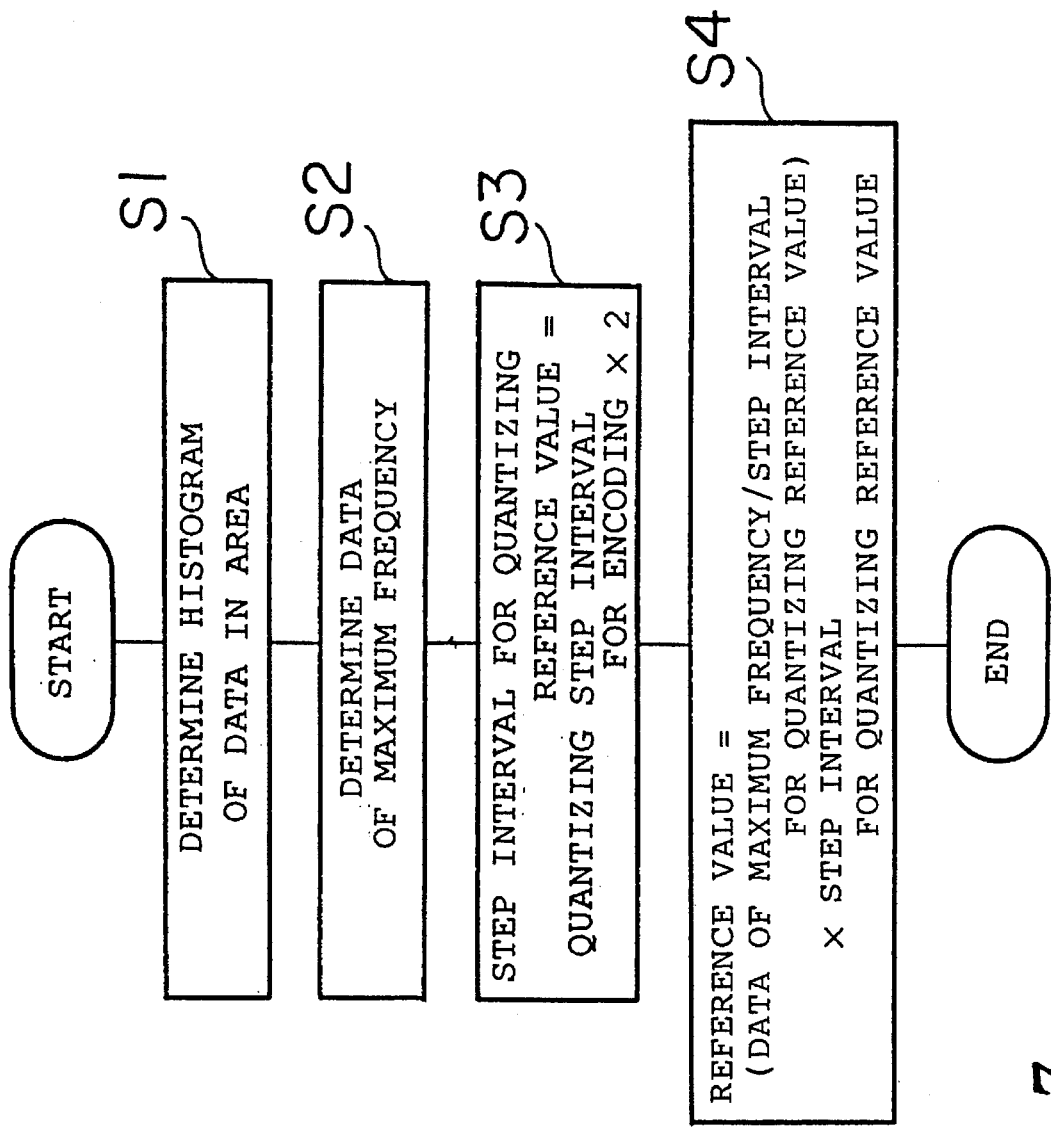
FIG. 17 is a flowchart of an operation sequence of the reference value determining function unit.

FIG. 17 is a flowchart of an operation sequence of the reference value determining function unit 122. The numbers following "S" in FIG. 17 represent step numbers. The maximum frequency data detector 122d shown in FIG. 16 operates in steps S1, S2. The quantizer selecting function unit 122a operates in a step S3. The quantizing function units 122b, 122c, operate in a step S4.

[S1] A histogram of the data in the area read from the memory 32 is generated.

[S2] Data with a maximum frequency is determined from the histogram.

[S3] The step interval of quantization effected in the quantizer 39 is doubled, for example, to calculate a step interval for quantizing the reference value.

[S4] The data determined in the step S2 are quantized with the step interval calculated in the step S3, thereby producing a reference value.

As described above, when the number of quantizing steps for image encoding in the quantizer 39 is small, the number of steps of quantizing the reference value is made small for thereby increasing the encoding efficiency.

While the reference value is determined on the basis of the maximum frequency data in the source encoder 22 according to the second embodiment, the average of the data may be calculated and quantized by the quantizing function to determine the reference value. Alternatively, the reference value may be determined on the basis of the maximum frequency data, rather than the average, in the source encoder 22 according to the first embodiment.

Figure 18:
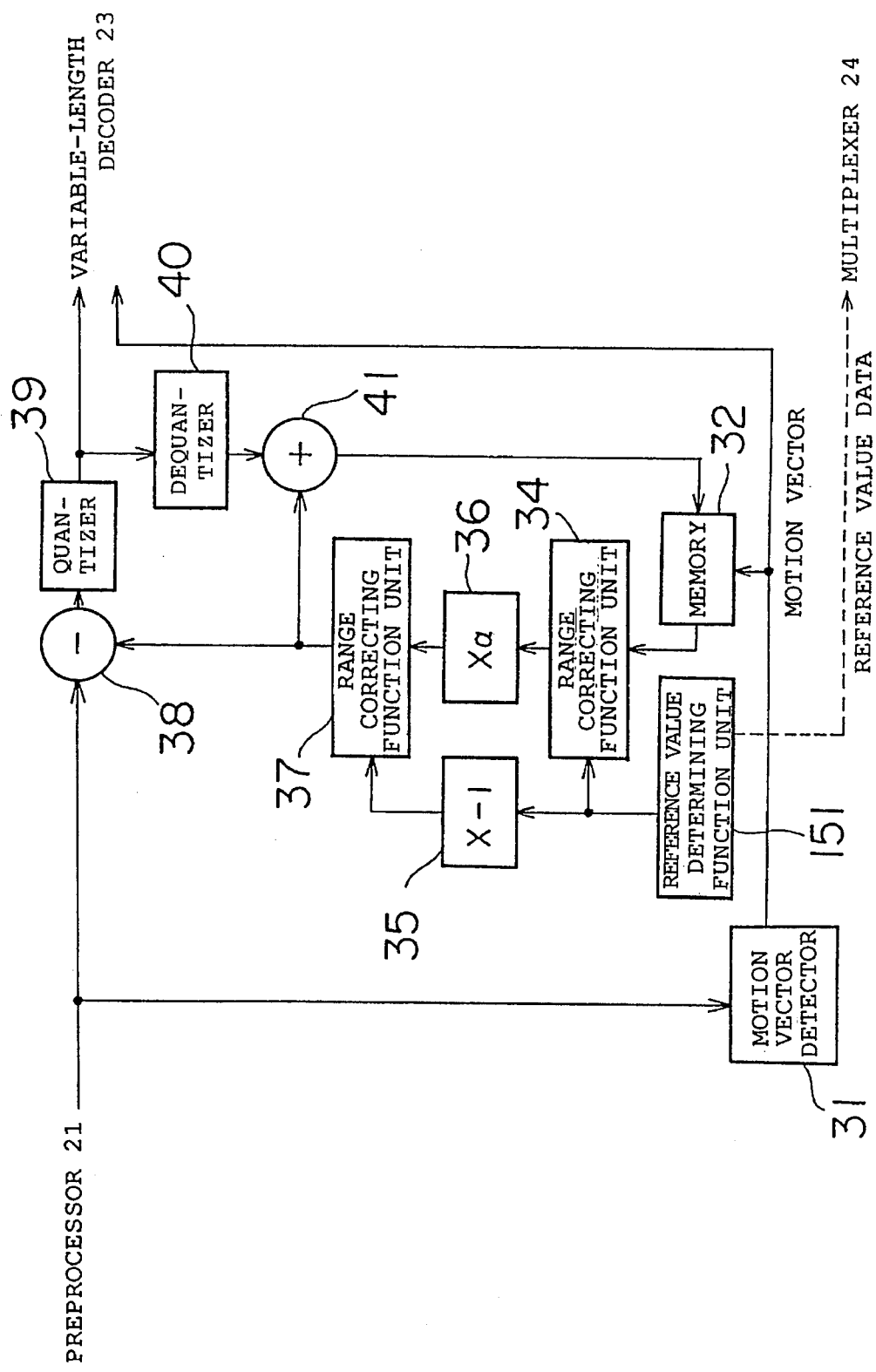
FIG. 18 is a block diagram showing a detailed internal structure of a source encoder according to a third embodiment of the present invention.

FIG. 18 is a block diagram showing a detailed internal structure of a source encoder according to a third embodiment of the present invention. The third embodiment is associated with an apparatus which processes an image produced by a camera in a fixed position and allows the operator to manually establish a reference value. Those parts of the source encoder shown in FIG. 18 which are identical to those of the source encoder 22 according to the first embodiment shown in FIG. 6 are denoted by identical reference numerals, and will not be described in detail below.

A reference value determining function unit 151 is not supplied with data of a preceding image read from the memory 32 and a motion vector from the motion vector detector 31, unlike the source encoder 22 according to the first embodiment. To the reference value determining function unit 151, there are connected switches SW1~SWn operable by the operator as shown in FIG. 19. The switches SW1~SWn correspond to the areas 1~n, respectively, and the operator can turn on the switches SW1~SWn to establish reference values for the corresponding areas.

Therefore, the operator establishes a desired reference value for each area, and the established reference value is maintained. Since the reference values are not required to be transmitted to the receiver at all times, the encoding efficiency can be increased.

Figure 20:
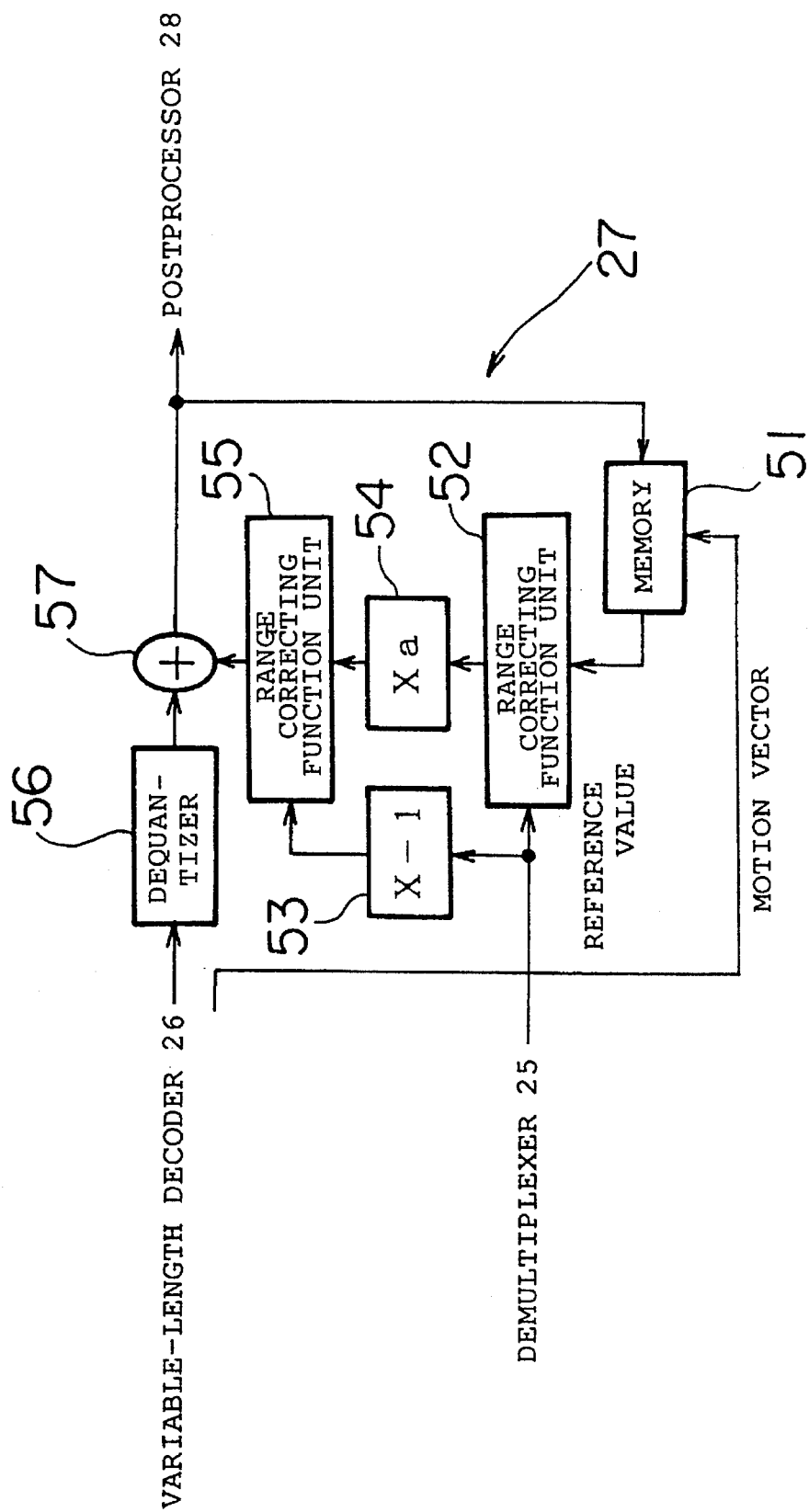
FIG. 20 is a block diagram showing an internal structure of a source decoder in the receiver shown in FIG. 5(B)

FIG. 20 is a block diagram showing an internal structure of the source decoder 27 in the receiver shown in FIG. 5(B).

The source decoder 27 is supplied with a motion vector from the variable-length decoder 26. The data of the area of the preceding image which is associated with the area of the present image that is indicated by the supplied motion vector are read from a memory 51 and delivered to a range correcting function unit 52. To the range correcting function unit 52 and an inverter 53, there are transmitted a reference value β from the reference value determining function unit 33 through the multiplexer 24 and the demultiplexer 25.

The range correcting function unit 52 corrects the range of the data of the preceding frame read from the memory 51 with the transmitted reference value β. The range correction in the range correcting function unit 52 is carried out in the same manner as the range correction effected in the range correcting function unit 34 of the transmitter shown in FIG. 6. A multiplier 54 which is supplied with the output data from the range correcting function unit 52 multiplies the supplied data by a leak coefficient α (0<a<1), and outputs the product data to a range correcting function unit 55. The reference value β is inverted by the inverter 53 and supplied as −β to the range correcting function unit 55. The range correcting function unit 55 operates in the same manner as the range correcting function unit 52, i.e., adds β to the range of the data, which have been multiplied by the leak coefficient, from the multiplier 54. The range corrected by the range correcting function unit 52 is now uncorrected back into the original range.

The quantized predictive error outputted from the variable-length decoder 26 is converted back, or dequantized, into the original predictive error by a dequantizer 56, and the output data from the range correcting function unit 55 are added to the original predictive error by an adder 57. By this addition, decoded data of the present frame are produced and outputted to the postprocessor 28, and also newly stored as preceding frame data in the memory 51 in preparation for a next cycle of processing.

A digital image communication apparatus according to a second embodiment of the present invention will be described below. In the second embodiment, the reference value for a range correction which is determined by the transmitter is not transmitted to the receiver, and the receiver generates a reference value by itself for effecting a range correction therein.

Figure 21:
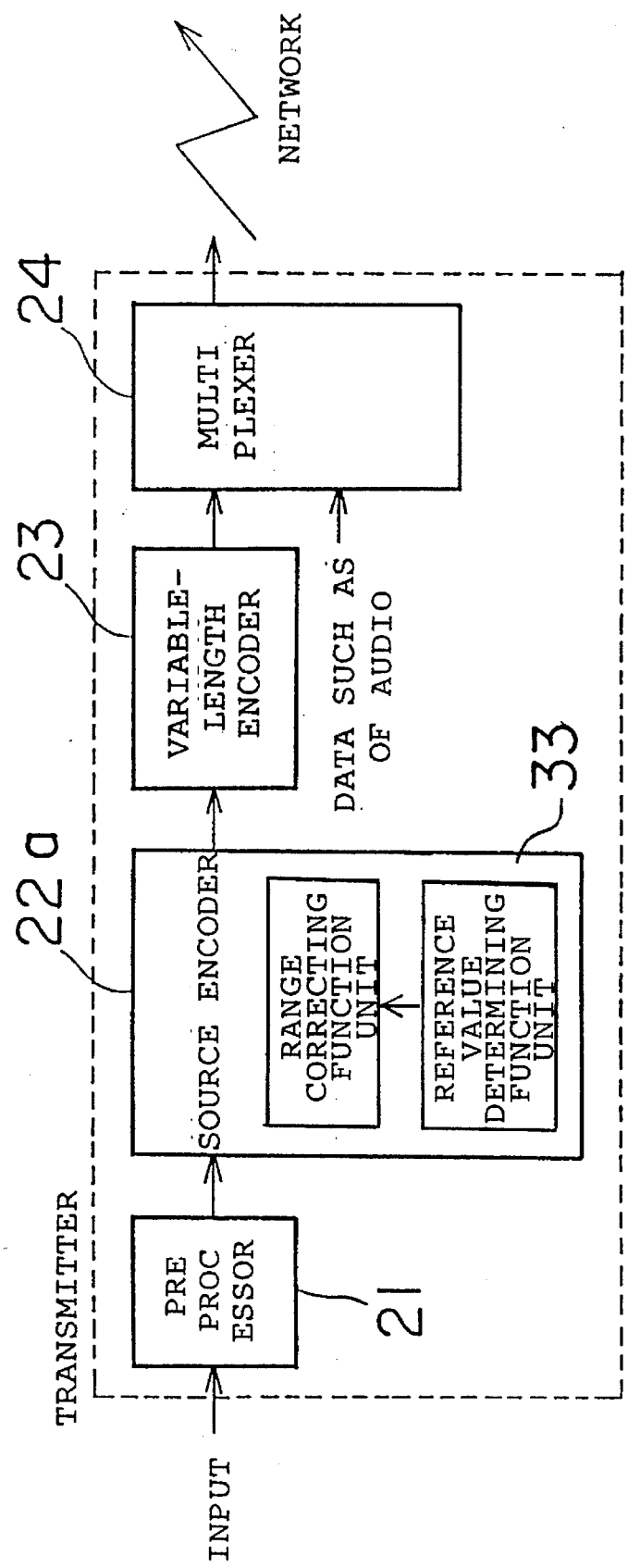
FIG. 21(A) is a block diagram showing a schematic arrangement of a transmitter of a digital image communication apparatus according to the second embodiment of the present invention.
FIG. 21(B) is a block diagram showing a schematic arrangement of a receiver of the digital image communication apparatus according to the second embodiment.
Figure 21:
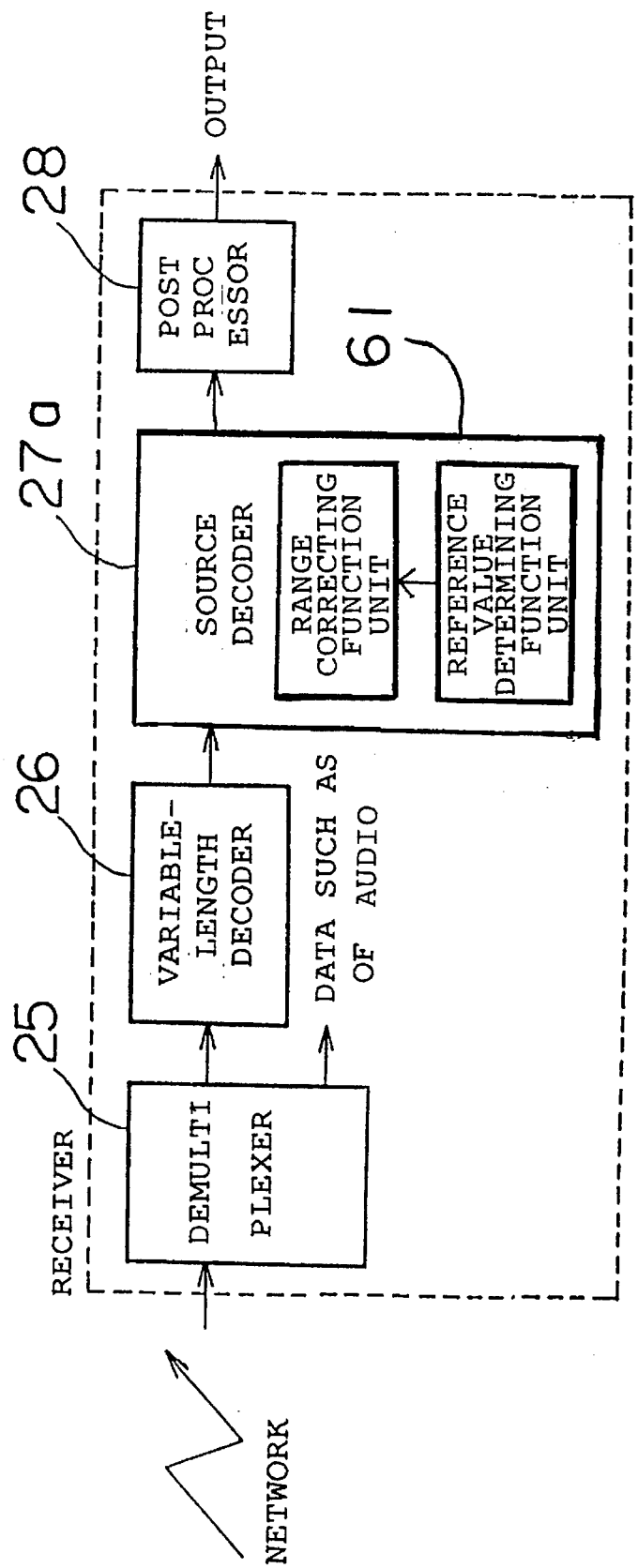

FIGS. 21(A) and 21(B) are block diagrams showing schematic arrangements of a transmitter and a receiver, respectively, of a digital image communication apparatus according to the second embodiment of the present invention. Since the arrangement of the second embodiment is basically the same as the arrangement of the first embodiment, only different parts will be described below while identical parts are denoted by identical reference numerals and will not be described below.

In the digital image communication apparatus according to the second embodiment, a reference value determined by a reference value determining function unit 33 in a source encoder 22a of the transmitter is not transmitted to the receiver, and a source decoder 27a in the receiver has a reference value determining function unit 61.

Figure 22:
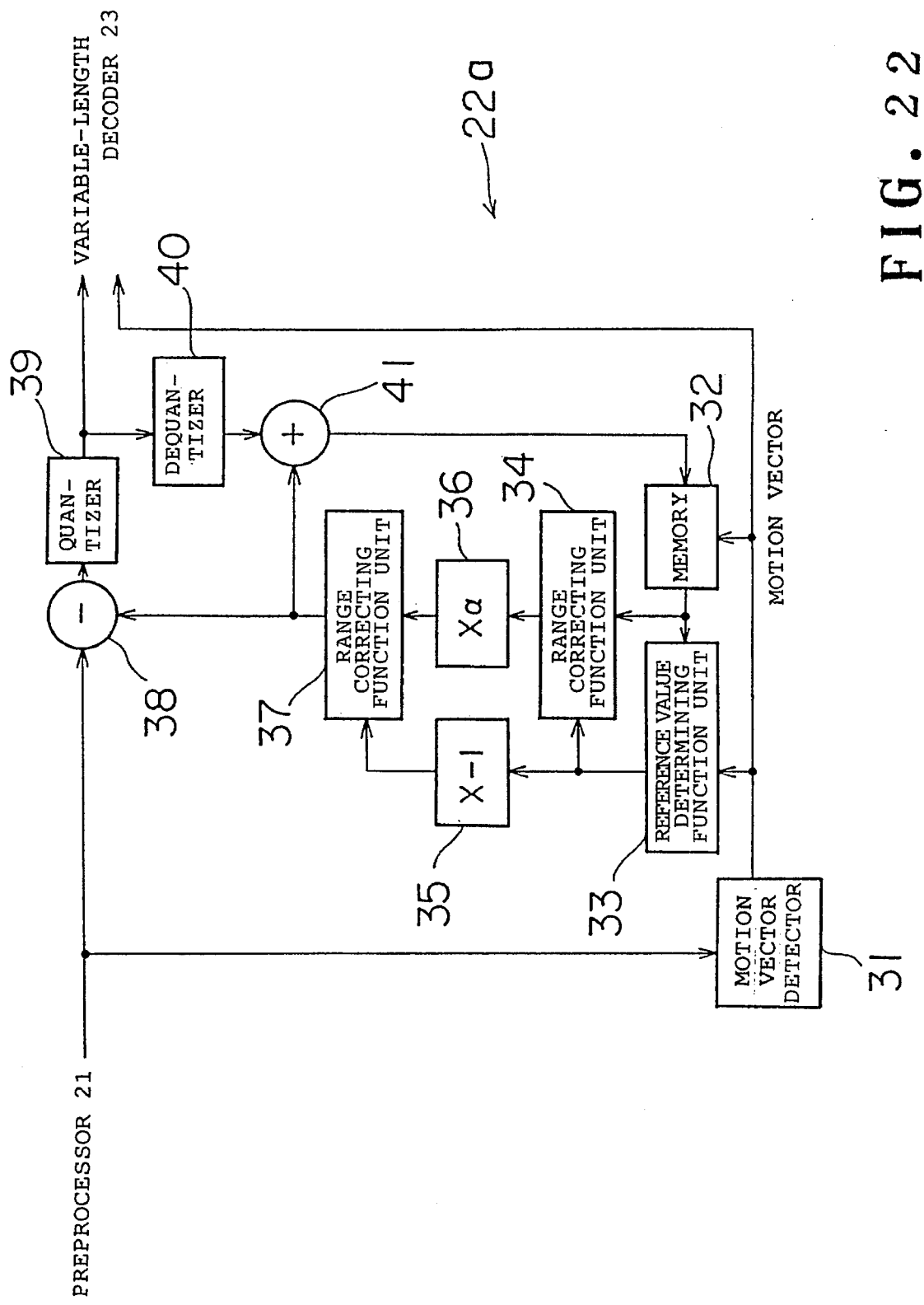
FIG. 22 is a block diagram showing an internal structure of a source encoder in the transmitter.

FIG. 22 is a block diagram showing an internal structure of the source encoder 22a in the transmitter. The source encoder 22a in the second embodiment is basically the same as the source encoder 22 in the first embodiment, except that the reference value determined by the reference value determining function unit 33 in the source encoder 22a is not transmitted to the receiver.

Figure 23:
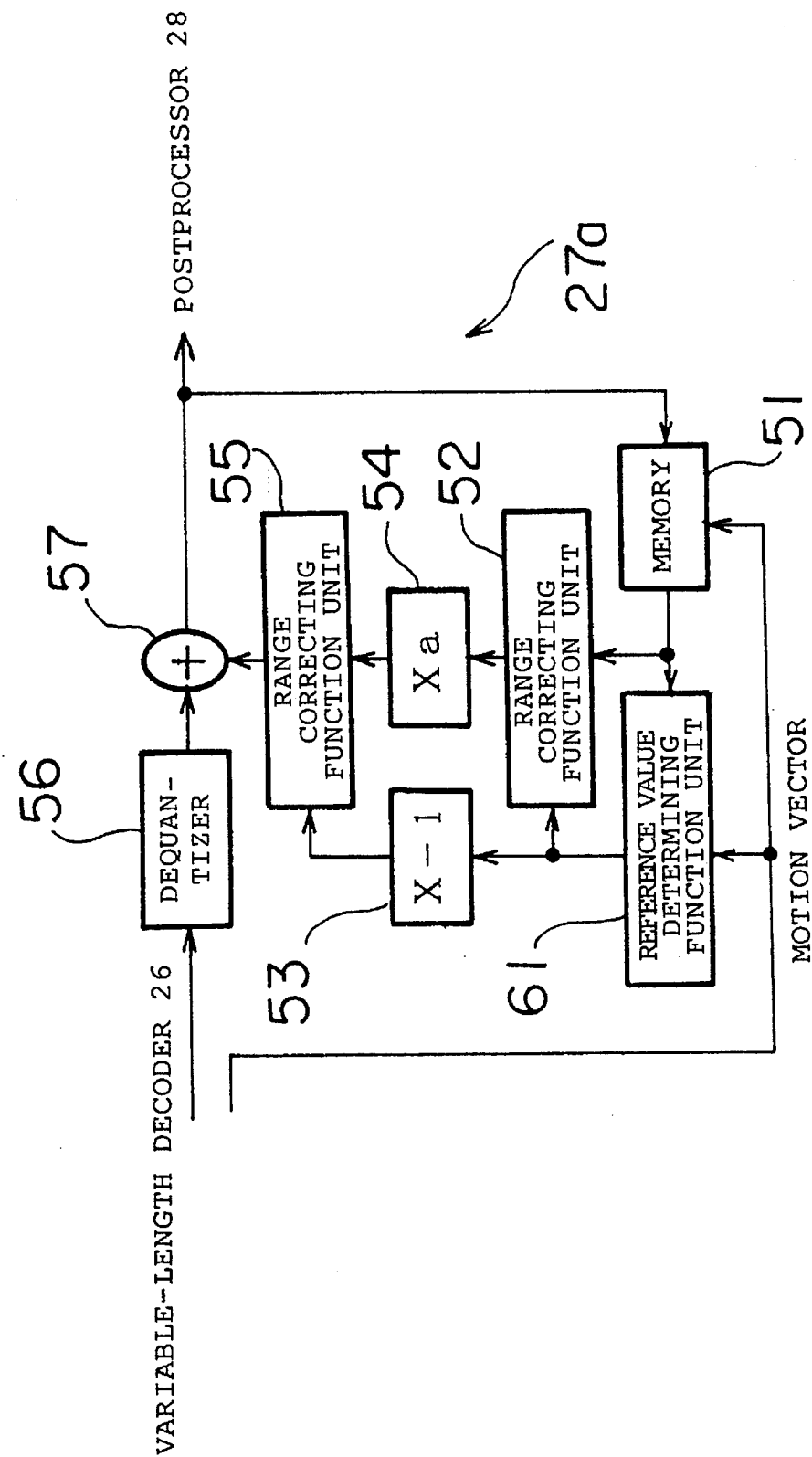
FIG. 23 is a block diagram showing an internal structure of a source decoder in the receiver.

FIG. 23 is a block diagram showing an internal structure of the source decoder 27a in the receiver. Because the source decoder 27a in the second embodiment is basically the same as the source decoder 27 in the first embodiment, only different parts will be described below while identical parts are denoted by identical reference numerals, and will not be described in detail below.

The source decoder 27a in the second embodiment has the reference value determining function unit 61. The reference value determining function unit 61 establishes a reference value by itself which is different from the reference value in the transmitter, based on the motion vector and the preceding frame data from the memory 51, and outputs the established reference value to the range correcting function unit 52 and the inverter 53.

Although the source decoder 27a in the second embodiment has a slight increase in the hardware, it is not necessary to transmit the reference value from the transmitter to the receiver, resulting in a reduction in the amount of information to be transmitted.

With the present invention, as described above, the range of input digital image data is corrected with an appropriate reference value in the digital image communication apparatus which effects interframe encoding using leaky prediction. Therefore, it is possible to suppress a reduction in the encoding efficiency caused by the leaky prediction.

What is claimed is:

1. An encoding system for a digital image communication apparatus which effects interframe encoding using leaky prediction, comprising:

memory means for storing digital image data of an inputted preceding frame;

reference value outputting means for outputting a reference value for a range correction;

range correcting means for correcting a range with respect to the digital image data of the preceding frame stored in said memory means according to the reference value outputted by said reference value outputting means;

leak coefficient multiplying means for multiplying the data corrected by said range correcting means by a predetermined leak coefficient and outputting product data;

uncorrecting means for uncorrecting the data outputted from said leak coefficient multiplying means to restore the range corrected by said range correcting means;

predictive error outputting means for detecting the difference between inputted digital image data of a present frame and the data uncorrected by said uncorrecting means, and outputting the detected difference as a predictive error; and predictive error encoding means for encoding the predictive error outputted from said predictive error outputting means in a predetermined manner and outputting the encoded predictive error.

2. An encoding system according to claim 1, wherein said reference value outputting means determines and outputs a reference value depending on the digital image data in an area of the preceding frame which is associated with the area of the present image that is indicated by a motion vector, among the digital image data of the preceding frame stored in said memory means, and wherein said range correcting means corrects the range of the digital image data in an area of the preceding frame which is associated with the area of the present image that is indicated by a motion vector, among the digital image data of the preceding frame stored in said memory means, according to the reference value determined by said reference value outputting means.

3. An encoding system according to claim 1, wherein said reference value outputting means determines and outputs a reference value depending on the digital image data of the preceding frame stored in said memory means, and wherein said range correcting means corrects the range of the digital image data of the preceding frame stored in said memory means according to the reference value determined by said reference value outputting means.

4. An encoding system according to claim 1, wherein said reference value outputting means outputs a reference value which is chronologically constant.

5. An encoding system according to claim 1, wherein said reference value outputting means outputs, as a reference value, the average of the digital image data of the preceding frame stored in said memory means.

6. An encoding system according to claim 1, wherein said reference value outputting means outputs, as a reference value, a quantized value of the average of the digital image data of the preceding frame stored in said memory means.

7. An encoding system according to claim 6, further comprising motion compensating means for detecting a motion vector to effect motion compensation, wherein said reference value outputting means determines the number of quantizing steps depending on the motion vector detected by said motion compensating means.

8. An encoding system according to claim 6, wherein said predictive error encoding means has error quantizing means for quantizing the predictive error, and said reference value outputting means determines the number of quantizing steps depending on the number of quantizing steps in said error quantizing means.

9. An encoding system according to claim 1, wherein said reference value outputting means outputs, as a reference value, data of maximum frequency among the digital image data of the preceding frame stored in said memory means.

10. An encoding system according to claim 1, wherein said reference value outputting means outputs, as a reference value, a quantized value of data of maximum frequency among the digital image data of the preceding frame stored in said memory means.

11. An encoding system according to claim 10, further comprising motion compensating means for detecting a motion vector to effect motion compensation, wherein said reference value outputting means determines the number of quantizing steps for quantizing said data of maximum frequency depending on the motion vector detected by said motion compensating means.

12. An encoding system according to claim 11, further comprising error quantizing means for quantizing the predictive error outputted from said predictive error outputting means, wherein said reference value outputting means determines the number of quantizing steps for quantizing said data of maximum frequency depending on the number of quantizing steps in said error quantizing means.

13. An encoding system according to claim 1, further comprising transmitting means for transmitting the reference value outputted from said reference value outputting means to a receiver.

14. A decoding system for a digital image communication apparatus for receiving and decoding a signal which has been interframe-encoded using leaky prediction, comprising:

reference value extracting means for extracting a reference value transmitted from a transmitter; and range correcting means for correcting a range of received digital image data based on the reference value extracted by said reference value extracting means.

15. A decoding system for a digital image communication apparatus for receiving and decoding a signal which has been interframe-encoded using leaky prediction, comprising:

reference value determining means for determining a reference value independently of a reference value used for a range correction in a transmitter; and range correcting means for correcting a range of received digital image data based on the reference value determined by said reference value determining means.

* * * * *

UNITED STATES PATENT AND TRADEMARK OFFICE
CERTIFICATE OF CORRECTION

PATENT NO. : 5,457,496

DATED : October 10, 1995

INVENTOR(S) : Hamano et al.

It is certified that error appears in the above-indentified patent and that said Letters Patent is hereby corrected as shown below:

Column 1, line 62, delete "<a<" and insert --<∝<--.

Column 2, line 18, delete "coefficient a" and insert --coefficient ∝--.

Column 2, line 19, delete "<a<" and insert --<∝<--.

Column 11, line 51, delete "<a<" and insert --<∝<--.

Signed and Sealed this

Twentieth Day of May, 1997

Attest:

Attesting Officer

BRUCE LEHMAN

Commissioner of Patents and Trademarks